United States Patent
Ichinose et al.

(10) Patent No.: US 7,297,202 B2
(45) Date of Patent: *Nov. 20, 2007

(54) DISPERSIBLE COLORANT, METHOD OF PRODUCING SAME, AQUEOUS INK USING SAME, INK TANK, INK JET RECORDING APPARATUS, INK JET RECORDING METHOD, AND INK JET RECORDED IMAGE

(75) Inventors: Hirofumi Ichinose, Tokyo (JP); Masashi Miyagawa, Yokohama (JP); Junichi Sakai, Machida (JP); Yoshio Nakajima, Yokohama (JP); Yoko Ichinose, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/311,644

(22) Filed: Dec. 20, 2005

(65) Prior Publication Data
US 2006/0124032 A1    Jun. 15, 2006

Related U.S. Application Data

(63) Continuation of application No. PCT/JP2005/012169, filed on Jun. 24, 2005.

(30) Foreign Application Priority Data
Jun. 25, 2004 (JP) ............................ 2004-188559

(51) Int. Cl.
*C09D 11/02* (2006.01)
(52) U.S. Cl. .................. 106/31.6; 106/31.65; 106/400; 106/494
(58) Field of Classification Search ............... 106/31.6, 106/400, 494, 31.65
See application file for complete search history.

(56) References Cited

U.S. PATENT DOCUMENTS

| 6,087,003 | A | 7/2000 | Benoit et al. ................ 428/403 |
| 6,627,696 | B1 * | 9/2003 | Takao et al. ................. 524/588 |
| 6,841,591 | B2 * | 1/2005 | Vincent et al. ............. 523/160 |

(Continued)

FOREIGN PATENT DOCUMENTS

JP           10-510243           10/1998

(Continued)

OTHER PUBLICATIONS

Translation of JP 2004-331946.*

*Primary Examiner*—J. A. Lorengo
*Assistant Examiner*—Veronica Faison-Gee
(74) *Attorney, Agent, or Firm*—Fitzpatrick, Cella, Harper & Scinto

(57) ABSTRACT

A dispersible colorant is provided which comprises a colorant and a chargeable resin pseudo fine particle of a size smaller than the size of the colorant being fixed or fused to the colorant, wherein the colorant itself has a surface charge. Thereby, it becomes possible to process a surface of the colorant while exploiting both the characteristic of a resin adhered and fixed to the surface of the colorant and the characteristic of the surface of the colorant, so that it is possible to provide a dispersible colorant that has sufficiently high dispersibility and a simple and easy method of producing the colorant, by use of a colorant that is essentially water-insoluble.

22 Claims, 5 Drawing Sheets

U.S. PATENT DOCUMENTS

| | | | |
|---|---|---|---|
| 6,916,862 B2 * | 7/2005 | Ota et al. | 523/200 |
| 2002/0075369 A1 * | 6/2002 | Ota et al. | 347/100 |
| 2004/0244622 A1 | 12/2004 | Ichinose et al. | 101/491 |
| 2005/0043434 A1 | 2/2005 | Ichinose et al. | 523/160 |
| 2006/0009544 A1 * | 1/2006 | Miyagawa et al. | 523/160 |
| 2006/0130706 A1 * | 6/2006 | Nakajima et al. | 106/499 |
| 2006/0135647 A1 * | 6/2006 | Ichinose et al. | 523/160 |
| 2006/0142417 A1 * | 6/2006 | Kaneko et al. | 523/160 |

FOREIGN PATENT DOCUMENTS

| | | |
|---|---|---|
| JP | 2001-262003 | 9/2001 |
| JP | 2004-10638 | 1/2004 |
| JP | 2004-82089 | 3/2004 |
| JP | 2004-331946 | 11/2004 |

* cited by examiner

FIG. 2A  DISPERSION OF COLORANT
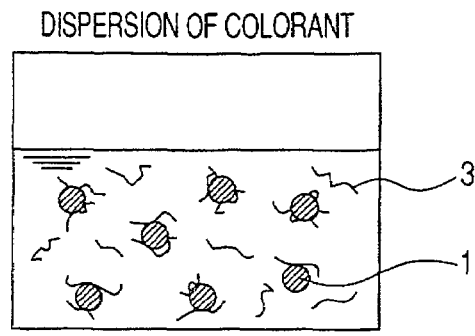
FIG. 2B  DROPWISE ADDITION OF INTIATOR/MONOMER, START OF POLYMERIZATION
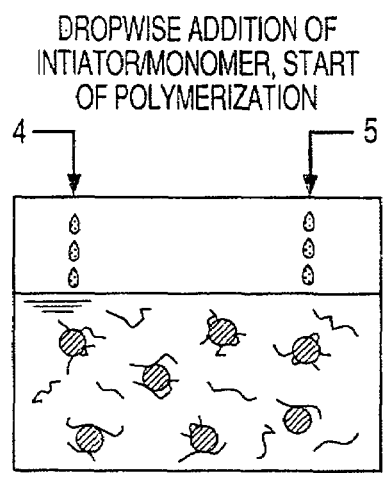
FIG. 2C  FORMATION OF DISPERSIBLE COLORANT
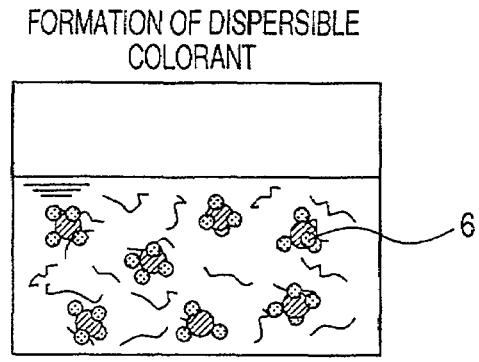
FIG. 2D  PURIFICATION/PRODUCT RECOVERY
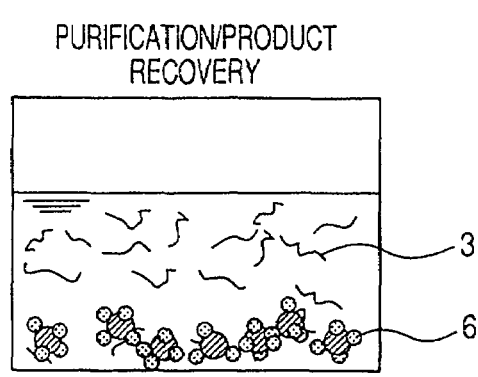

DISPERSIBLE COLORANT, METHOD OF PRODUCING SAME, AQUEOUS INK USING SAME, INK TANK, INK JET RECORDING APPARATUS, INK JET RECORDING METHOD, AND INK JET RECORDED IMAGE

This application is a continuation of International Application No. PCT/JP2005/012169, filed on Jun. 24, 2005, which claims the benefit of Japanese Patent Application No. 2004-188559 filed on Jun. 25, 2004.

BACKGROUND OF THE INVENTION

1. Field of the Invention

This invention relates to a dispersible colorant and a method of producing the same as well as to an aqueous ink using the same for ink jet recording, an ink tank, an ink jet recording apparatus, an ink jet recording method and an ink jet recorded image.

2. Related Background Art

The ink jet system is a system for recording images, characters or the like by forcing fine ink droplets to fly from a nozzle on the basis of any of various known actuating principles and causing them to arrive at a recording medium (e.g., a sheet of paper). The ink jet system is characterized by the easiness of realizing high speed and low noise multicolor printing, the versatility of recorded patterns and the disuse of development and fixing processes, which rapidly have made the ink jet system very popular for a variety of applications. Furthermore, the development of the full color or multicolor ink jet recording system in recent years has made them comparable with multicolor printing by conventional plate making and color photography in terms of forming high quality multicolor images. Particularly, the color ink jet recording system is finding various applications in the field of full color image recording because it can produce less expensive printed matters if compared with ordinary multicolor printing and color photography when the number of copies is small.

Many improvements have been made to ink jet recording apparatus and ink jet recording methods to meet the demand for a higher recording speed, a higher level of image precision and perfect full color images. Requirements to be met by ink for ink jet recording apparatus include (1) it provides uniform images of high resolution and high optical density that are free from blurring and fogging, (2) it shows a high ejection responsiveness and a high ejection stability and does not give rise to any clogging due to ink drying at a tip of an ejection nozzle, (3) it fixes well on sheets of paper, (4) it provides images of good fastness and (5) it has good storage stability for a long period of time. Particularly, high speed printing that has been achieved in recent years requires the use of ink that dries and fixes quickly to provide high quality images even if it is used on plain paper such as copying paper.

Intensive efforts have been and being paid for developing a colorant by using a pigment that is excellent in waterfastness and weatherability of image and water-insoluble so as to make them operate as ink for ink jet recording. As a matter of fact, such colorants are being used in the field of large size printers. Additionally, researches have been and being made for inks that contain pigments for the purpose of ink jet recording by printers for office use and personal use. Sheets of plain paper are dominantly being used as recording medium in such applications and the requirements that are being posed on such inks are rigorous than ever particularly in terms of image fixability, rubfastness, quality of printed characters, image density, waterfastness and other characteristics probably because such inks are desirably equally usable for glossy paper and other special paper.

When using a water-insoluble colorant, a pigment in particular, for an aqueous ink to be used for ink jet recording, it is firstly required that the colorant can be dispersed stably into water. Generally, when a water-insoluble colorant is used for an aqueous ink to be used for ink jet recording, a surfactant or a polymeric dispersing agent (also referred to as "dispersing resin") is used to disperse/stabilize the colorant.

For instance, Japanese Patent Application Laid-Open No. H10-120955 discloses an ink for ink jet recording having a colorant dispersed and stabilized by means of a dispersing resin. However, the disclosed ink is accompanied by a problem that because the dispersing resin itself is highly affinitive with water and is therefore highly soluble into water, the dispersing resin can easily leave the surface of the colorant and hence the colorant cannot remain in a sufficiently stabilized state for a long period of time. Additionally, when such ink impacts against the surface of plain paper, the highly hydrophilic dispersing resin will function as a penetrating agent and penetrate deep into the plain paper with the colorant, thus making it impossible to obtain a sufficient image density. Further, as a result of using an ink containing a polymer component such as a highly water-soluble dispersing resin for ink jet recording, there is a case where the ink adheres to a nozzle of the ink jet recording apparatus both at the outside and in the inside thereof. Then, as a result, both the size and the moving direction of the ejected ink droplets become unstable to consequently give rise to disturbance of image, thereby posing a problem in obtaining a highly precise image. Additionally, when the content of a water-soluble dispersing resin is increased in order to improve the rubfastness of an image formed on plain paper or glossy paper, the viscosity of the ink will increase to make it very difficult to maintain the ejection stability of the ink from the ink jet recording apparatus.

Japanese Patent Application Laid-Open No. 2001-081372 discloses an ink for ink jet recording having a colorant dispersed therein by means of polyoxyethylenealkylether sulfate, which is a surfactant. When a colorant is dispersed by means of a surfactant, the surfactant that is firmly adsorbed to the colorant may function also as a penetrating agent. Therefore, as the ejected ink impacts against the surface of recording paper, the colorant will penetrate deeply into recording paper, thereby making it hardly possible to obtain a high print density. Additionally, a colorant that is dispersed by means of a surfactant is free from an agent such as a resin that provides a bonding action on the surface of recording paper and hence the image formed by using such a colorant may pose a problem that the rubfastness and marker resistance (tolerance to marker pen) of a formed image can not be obtained sufficiently.

Known methods of stably dispersing a colorant without using a dispersing resin or a surfactant include techniques for chemically modifying the surface of a water-insoluble colorant. For example, Japanese Patent Application Laid-Open No. H10-195360 discloses an aqueous pigment ink using, as a colorant, a self-dispersing type carbon black formed by bonding a hydrophilic group to the surface of carbon black directly or through another group. Such a surface chemically modified pigment is referred to as a self-dispersing pigment and shows good ink jet ejection stability because it does not need any water-soluble resin or the like. However, according to the consideration of the present inventors, such a colorant does not contain any resin and therefore has a poor adhesion to recording paper, so that the rubfastness and marker resistance thereof need to be improved.

Independently of the above-described dispersing technique, Japanese Patent Application Laid-Open No. H08-183920 discloses a method of dispersing a coloring agent in an organic solvent, subsequently enclosing the coloring agent with a self-dispersing resin by phase conversion emulsification, followed by dispersion in water and removal of a solvent. The resulting pigment is a so-called microcapsule pigment and, also in this case, in order to attain sufficient dispersion stability, it is necessary to increase the hydrophilicity of the coating resin. However, consideration by the present inventors has revealed that while the dispersibility is improved by increasing the hydrophilicity, the coating resin may sometimes be detached from the pigment surface to thereby increase the viscosity of the ink, so that it becomes difficult to strike a balance between the ejection stability and the dispersion stability.

Other techniques for enclosing a coloring agent with a resin include those using aqueous precipitation polymerization as described in "Colorants", 68 [9], 1995, p. 535-541, Japanese Patent Application Laid-Open Nos. H05-222109, H07-010911, H09-100303 and 2003-034770. Although the above listed "Colorants", 68 [9], 1995, p. 535-541 and Japanese Patent Application Laid-Open No. H05-222109 describe encapsulation of a pigment by aqueous precipitation polymerization and completing of a pigment and a resin, the described particle size is large and hence the dispersion stability is insufficient for use in aqueous ink jet recording.

Japanese Patent Application Laid-Open Nos. H07-010911 and H09-100303 disclose a method of producing dispersed particles of pigment having a particle size suitable for ink jet recording by dispersing a colorant in advance by means of a reactive surfactant and polymerizing the reactive surfactant and other monomers to precipitate a resin, thereby coating or modifying the surface of the colorant. Furthermore, Japanese Patent Application Laid-Open No. 2003-034770 discloses a technique of dispersing a colorant by means of a surfactant that satisfies certain special requirements and subsequently conducting aqueous precipitation polymerization. With these techniques, the resulting colorant that is modified by the resin is essentially dispersed and stabilized due to the existence of a surfactant or a water-soluble polymeric dispersing agent in the ink. Therefore, as described above, it is very difficult to strike a balance between the ejection stability that is suited to an ink jet recording apparatus and the sufficient printing quality of a recorded image particularly from the viewpoint of the print density.

As described above, there have been proposed methods of treating a water-insoluble colorant, particularly the surface of various pigments for dispersing by means of a resin or surfactant, methods that employ chemical modification and methods that employ microencapsulation. However, each of the proposed methods is accompanied by problems to be dissolved in terms of image density, ejection stability, rubfastness, marker resistance, dispersion stability and so on. Particularly, they need to be improved with regard to establishment of sufficient image density and rubfastness in plain paper recording, and compatibility thereof with sufficient ejection stability.

Furthermore, WO 02/066564 discloses an ink that contains, as coloring agent, both a pigment having a water-dispersibility-donative group incorporated into a surface thereof and a pigment having a surface enclosed with a water-dispersible polymer. Although the disclosed ink has been developed aiming at simultaneous improvement of both color developability on plain paper and rubfastness on exclusive paper, it merely has a simple composition in which the both pigments having the respective characteristics are mixedly contained and is therefore not so satisfactory as to allow the two pigments, after being arrived at the paper, to remedy each other's deficient property. In short, the disclosed ink that contains the two kinds of pigments having the respective characteristics is not satisfactory in terms of both color developability and rubfastness and still has a room for improvement.

Finally, Japanese Patent Application Laid-Open Nos. H09-152342 and 2001-152060 disclose an ink realized by using a microencapsulated pigment that is formed by coating a water-insoluble colorant such as carbon black with an organic polymer and regulating the relationship between the colorant and the coating resin. More specifically, the color density, the preciseness, the color rendering property, the transparency and the color developability are improved by regulating a pigment content and a resin coating ratio. However, the disclosed methods employ the conventional technique of microencapsulation using phase conversion emulsification and hence are characterized in that the resin coat which covers the surface of a colorant is not uniform.

SUMMARY OF THE INVENTION

The present inventors have conducted extensive studies using the above-described known techniques. As a result, they have come to recognize that the problem to be solved is to strike a balance between stable dispersion of a colorant as an essentially water-insoluble substance in ink and production of a printed matter showing excellent image quality (particularly when recorded on plain paper), excellent rubfastness and excellent marker resistance.

Additionally, the present inventors have also come to find that, when processing or modifying a water-insoluble colorant (particularly when recorded on plain paper), it is necessary to appropriately select the characteristics and amount of a material such as a resin and the method for processing or modifying the colorant and that all the conventional methods are defective in some aspects or insufficient in terms of performance.

Furthermore, the present inventors have come to the conclusion that it is most appropriate to make a resin adhered and fixed to a water-insoluble colorant and it is essential to improve the state in which the resin is adhered and fixed, the shape of the resin adhered and fixed to the surface of the water-insoluble colorant and the surface characteristics of the water-insoluble colorant. However, it is difficult to realize a uniform state for the resin that is adhered and fixed to the surface of the colorant and to control the shape and arrangement of the adhered and fixed resin by any of the above described conventional methods. It is also difficult to effect processing that effectively exploits both the characteristics of the resin that is adhered and fixed to the surface of the colorant and the characteristics of the surface of the colorant.

Therefore, it is an object of the present invention to provide a dispersible colorant that has sufficiently high dispersibility and a simple and easy method of producing such a colorant, by use of a colorant that is essentially water-insoluble.

It is another object of the present invention to provide an aqueous ink for ink jet recording that is formed by using such a dispersible colorant and ensures that the colorant can stably be dispersed in the ink and the printed matter obtained by using the ink strikes a balance between an excellent image quality (image density), and excellent rubfastness and excellent marker resistance.

It is still another object of the present invention to provide an ink tank, an ink jet recording apparatus and an ink jet recording method to be used with such an ink as well as an ink jet-recorded image formed by using such an ink.

The present inventors have succeeded in obtaining a novel dispersible colorant that can maintain a high degree of dispersion stability without requiring a surfactant and/or a polymeric dispersing agent and effectively exploit the advantages provided by the coated shape of the water-insoluble colorant and the surface characteristics of the colorant itself.

Thus, in an aspect of the present invention, there is provided a dispersible colorant comprising a colorant and a chargeable resin pseudo fine particle of a size smaller than the size of the colorant being fixed or fused to the colorant, wherein the colorant itself has a surface charge.

In another aspect of the present invention, there is provided a method of producing a dispersible colorant comprising the steps of preparing an aqueous dispersive solution having dispersed therein a water-insoluble colorant having at least one kind of polar group bonded directly or through an atomic group to a surface thereof; and subjecting radically polymerizable monomers to aqueous precipitation polymerization by use of an aqueous radical polymerization initiator in the aqueous dispersive solution, thereby forming a dispersible colorant comprising a chargeable resin pseudo fine particle fixed or fused to the surface of the water-insoluble colorant.

In still another aspect of the present invention, there is provided an aqueous ink comprising the above-mentioned dispersible colorant.

In still another aspect of the present invention, there is provided an ink tank containing the above-mentioned aqueous ink.

In still another aspect of the present invention, there is provided an ink jet recording apparatus having the above-mentioned aqueous ink mounted thereon.

In still another aspect of the present invention, there is provided an ink jet recording method comprising forming an image by using the above-mentioned aqueous ink with an ink jet recording apparatus.

In a further aspect of the present invention, there is provided an ink jet-recorded image formed by using the above-mentioned aqueous ink with an ink jet recording apparatus.

Thus, according to the invention, it is now possible to realize a process of producing an aqueous ink by effectively exploiting the advantages provided by the characteristics of the resin adhered and fixed to the surface of the colorant and the surface characteristics of the water-insoluble colorant itself by improving the state of being adhered and fixed and the shape of the adhered and fixed resin and the surface characteristics of the colorant by means of a novel method of adhering and fixing resin a to a colorant so as to make the state of arrangement of the resin adhered and fixed to the colorant controllable. Therefore, it is possible to provide a dispersible colorant that is essentially water-insoluble but shows sufficient dispersion stability and a simple and easy method of producing such a colorant. Additionally, it is also possible to provide an aqueous ink that is suited to ink jet recording formed by using the dispersible colorant in such a manner that the colorant can be dispersed stably in the ink and the obtained printed matter strikes a balance between high image quality and excellent rubfastness, and an ink tank containing such an aqueous ink as well as an ink jet recording apparatus and an ink jet recording method for using such an aqueous ink and an ink jet-recorded image formed by using such an aqueous ink.

BRIEF DESCRIPTION OF THE DRAWINGS

FIGS. 2A, 2B, 2C and 2D are schematic illustrations of typical steps of a production method in accordance with the invention;

Figure 1A:
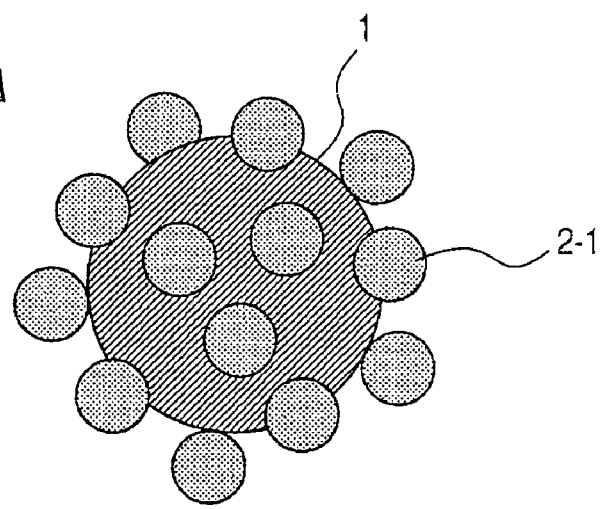
FIGS. 1A, 1B and 1C are schematic illustrations of the basic structure of a particle of a dispersible colorant having chargeable resin pseudo fine particles fixed or fused thereto in accordance with the present invention.

Throughout the figures, reference numeral 1 denotes a colorant, 2-1 denotes an chargeable resin pseudo fine particle, 2-2 denotes a partly fused chargeable resin pseudo fine particle, 2-3 denotes a fused flat chargeable resin pseudo fine particle, 3 denotes a dispersing agent, 4 denotes a monomer, 5 denotes an aqueous solution of a polymerization initiator, 6 denotes a dispersible colorant, 7 denotes an oligomer formed by polymerization of monomers, 8 denotes a precipitate of oligomers produced by insolubilization in water, 9-1 denotes a hydrophilic monomer unit part of a chargeable resin pseudo fine particle, 9-2 denotes a hydrophobic monomer unit part of a chargeable resin pseudo fine particle, 10 denotes a site of bonding to a colorant, 11 denotes a flat chargeable resin pseudo fine particle adhered to molecules 1a of a colorant, and 12 denotes a hydrophilic group for direct modification of a colorant.

DESCRIPTION OF THE PREFERRED EMBODIMENTS

Now, the present invention will be described in greater detail by way of the best mode for carrying out the invention. For the purpose of the present invention, the term "dispersible colorant" herein employed refers to a colorant that can essentially be dispersed in water or an aqueous medium without requiring addition of a surfactant or a polymeric dispersant for dispersing the colorant, i.e., a colorant having self-dispersibility.

Figure 1B:
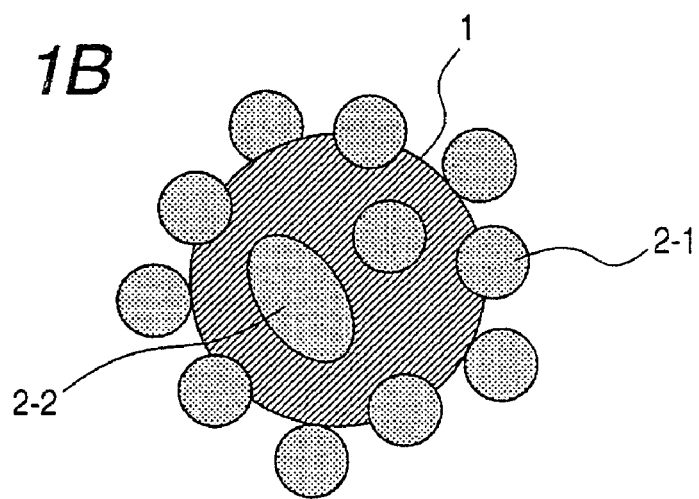
Figure 1C:
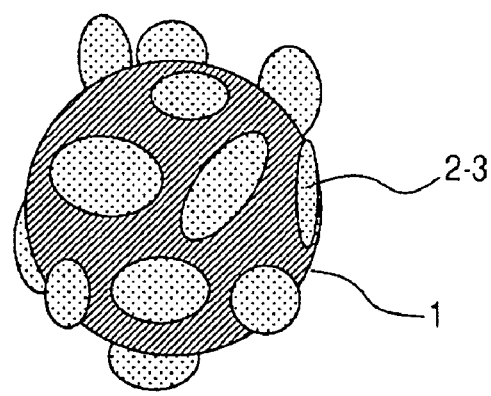

(1) Fixing or Fusion of Chargeable Resin Pseudo Fine Particles to Colorant, and Modes and Action/Effect Thereof A first characteristic feature of the present invention is that chargeable resin pseudo fine particles fix or fuse to a water-insoluble colorant carrying a surface charge that allows the colorant itself to disperse stably. FIGS. 1A, 1B and 1C schematically illustrate the feature of the present invention. More specifically, FIG. 1A schematically illustrates a state in which chargeable resin pseudo fine particles 2-1 fix to a water-insoluble colorant 1; FIG. 1B schematically illustrates a state in which chargeable resin pseudo fine particles 2-2 that fix to the surface of a water-insoluble colorant 1 partly fuse to the colorant 1; and FIG. 1C schematically illustrates a state in which flat chargeable resin pseudo fine particles 2-3 fuse to a water-insoluble colorant 1.

The present invention is remarkably characterized in that, when a resin attaches and is fixed to the surface of a water-insoluble colorant, there are two modes including one mode in which chargeable resin pseudo fine particles fix to the surface while maintaining their shapes to a certain extent and the other mode in which a resin agglomerate of chargeable resin pseudo fine particles fuses in a flat shape to the surface. As a result, the present invention provides various actions and effects.

First, the colorant is provided with a charge given by the chargeable resin pseudo fine particles fixing or fusing to its surface to become dispersible in water or aqueous ink mediums. Thus, the dispersible colorant is produced. Further, at the same time, the dispersible colorant exhibits high adhesion to a recording medium due to the presence of the resin component fixing to its surface. Moreover, the dispersible colorant of the present invention exhibits high storage stability for extended periods, because the chargeable resin pseudo fine particles fixing or fusing to the colorant surface, not by mere physical adsorption of the resin component, which is the feature of the dispersible colorant of the present invention, are rarely separated from the surface.

The chargeable resin pseudo fine particles for the present invention constitute a resin agglomerate in which the resin components are strongly agglomerated with each other, preferably having many physical crosslinks inside (resin agglomerate is composed of a resin component stably present in the form of fine particles, which may be agglomerated into still fine particles). The chargeable resin pseudo fine particles will be described in detail later.

For the purpose of the present invention, the term "chargeable resin pseudo fine particles" herein employed refers to resin agglomerates in which resin components are in a strongly aggregated state. Preferably such resin agglomerates form many physical crosslinks inside thereof and are stably in the form of fine particles, similar fine aggregates and/or flat resin agglomerates. Such chargeable resin pseudo fine particles will be described in greater detail hereinafter.

Figure 4:
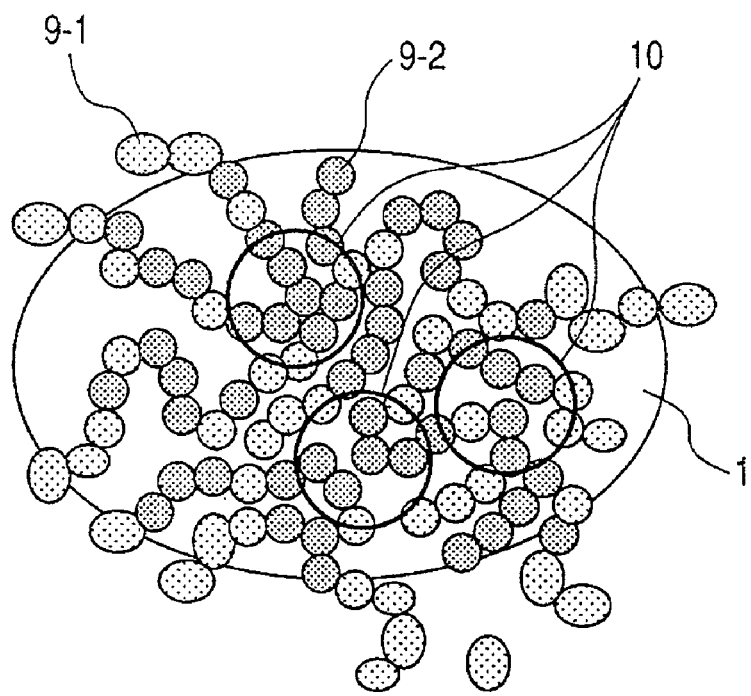
FIG. 4 is an enlarged schematic illustration of chargeable resin pseudo fine particles that are fixed or fused to a colorant as viewed from the side of the interface thereof.

The chargeable resin pseudo fine particles fix or fuse to the colorant for the present invention by strong interactions between them. This is considered to be achieved by the following phenomenon. FIG. 4 is an enlarged view schematically showing an interface of the chargeable resin pseudo fine particles with the colorant. It should be noted first that the chargeable resin pseudo fine particles are formed at the interface with the colorant by polymers composed of various monomer unit compositions, entwined with each other. At this time, the polymers locally take various structures and hence have a distribution generated in the surface energy. The colorant and the chargeable resin pseudo fine particles are bonded strongly to each other along the interface at spots where the surface energy of the colorant that is produced by the chemical structure and the surface structure thereof and the surface energy of the polymers that is produced by the chemical structure and the surface structure thereof agree well with each other. Further, as indicated by reference numeral 10 in FIG. 4, there are a plurality of spots where the surface energies agree with each other along the interface where a single chargeable resin pseudo fine particle is in contact with the colorant and it is assumed that the fixing and fusion states of the present invention are realized by the strong interactions between the plurality of spots.

Incidentally, for the purpose of the present invention, a state where a chargeable resin pseudo fine particle is in contact with the colorant by, for example 25% or more, preferably by 35% or more, of the surface area thereof is referred to as "fusion" for the sake of convenience, and it is not necessary in this state that the chargeable resin pseudo fine particle and the colorant are melted mixedly with each other at the interface.

Particularly, the polymers that constitute the inside of a chargeable resin pseudo fine particle are strongly interacting with each other and there may be cases where the polymers are entangled with each other to form physical crosslinks, so that if the chargeable resin pseudo fine particle has many hydrophilic groups, the chargeable resin pseudo fine particle will not leave the colorant and the resin components having hydrophilic groups will not keep on being eluted from the chargeable resin pseudo fine particle.

One of the advantages brought about by the chargeable resin pseudo fine particles that are fixed or fused to the dispersible colorant is that the specific surface area of the dispersible colorant is increased due to its shape and the electric charge that the chargeable resin pseudo fine particles have on the surfaces thereof can be made to distribute on many parts of the dispersible colorant. Because the dispersible colorant has a large specific surface area, the electric charge of the chargeable resin pseudo fine particles can be highly efficiently turned into the surface charge of the dispersible colorant. In other words, the shape of the dispersible colorant in accordance with the invention provides an advantage that more surface charge can be arranged efficiently on the surface of the dispersible colorant, so that when compared with the shape of coating a colorant with a resin as typically disclosed in Japanese Patent Application Laid-Open No. H08-183920, it is possible to impart high dispersion stability even if the effective acid value or amine value of the resin component is small.

Figure 5:
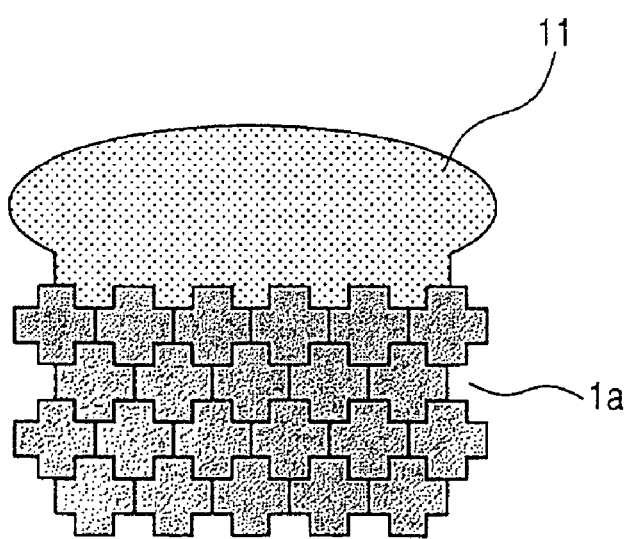
FIG. 5 is an enlarged schematic illustration of an interface where a chargeable resin pseudo fine particle is fixed or fused to a colorant.
Figure 6A:
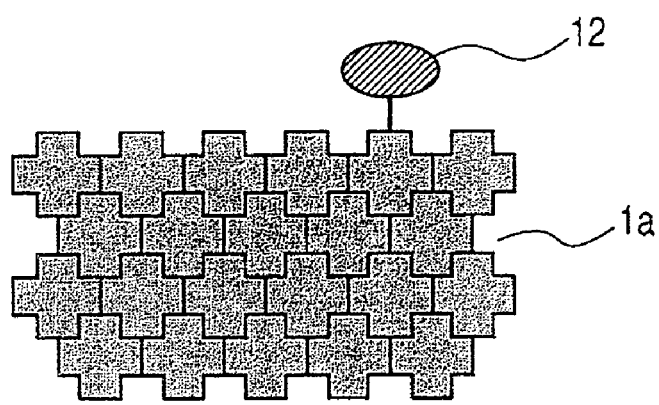
FIGS. 6A and 6B are schematic illustration of a phenomenon where a pigment is partly peeled off when a conventional organic pigment is directly modified by a hydrophilic group.
Figure 6B:
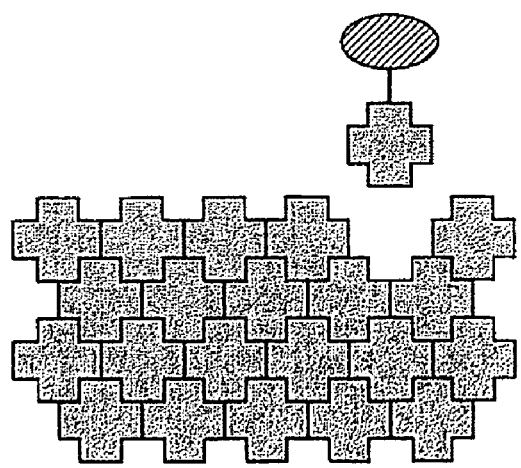

In the case of a dispersible colorant in accordance with the invention formed by using an organic pigment, because a plurality of spots of interaction of the chargeable resin pseudo fine particles are distributed randomly in a state in which they are fixed or fused to the colorant as described above, an chargeable resin pseudo fine particle 11 will be fixed at the same time to a number of pigment molecules 1a in the pigment crystal (see FIG. 5). Therefore, the pigment peeling off due to local hydrophilization of pigment molecules as illustrated in FIGS. 6A and 6B will never take place in a dispersible colorant in accordance with the present invention. When an organic pigment is used for forming a colorant in accordance with the present invention, it is preferable to control the size of chargeable resin pseudo fine particles to be smaller than the size of pigment particles but larger than the size of pigment molecules, whereby it is possible to obtain a dispersible colorant of an organic pigment that is highly dispersive without destroying the crystal structure of the pigment.

For the purpose of the present invention, the state in which chargeable resin pseudo fine particles are "fixed" or "fused" to a colorant can be simply confirmed by means of a technique that involves three separation steps as described below. In the first separation step, the colorant in question and the other water-soluble components (including water-soluble resin components) contained in the ink or aqueous dispersion product are separated from each other. In the second separation step, the colorant and the water-insoluble resin components contained in the precipitate that is produced in the first separation step are separated from each other. Then, in the third separation step, the resin components that are weakly adsorbed and the dispersible colorant having chargeable resin pseudo fine particles fixed or fused thereto are separated from each other. Then, it is possible to confirm the state in which chargeable resin pseudo fine particles are fixed or fused to the colorant by quantifying the resin components contained in the supernatant obtained in the third separation step and comparing the precipitate produced in the second separation step with the precipitate produced in the third separation step. More specifically, such a state can be confirmed in a manner as described below. 20 g of the ink or the aqueous dispersion product in which the colorant is dispersed is regulated so as to make all the solid contents equal to about 10% by mass. Then, the first separation step is conducted in a centrifugal separator under the condition of 12,000 rpm for 60 minutes. Of the separation products, the precipitate of the lower layer that contains the colorant is redispersed in pure water showing a weight three times greater than that of the precipitate and subjected to the second separation step in a centrifugal separator under the condition of 80,000 rpm for 90 minutes. Of the separation product, again, the precipitate of the lower layer that contains the colorant is redispersed in pure water showing a weight three times greater than that of the precipitate and subjected to the third separation step in a centrifugal separator under the condition of 80,000 rpm for 90 minutes. Then, the precipitate of the lower layer that contains the colorant is redispersed in pure water showing a weight three times greater than that of the precipitate. A specimen of the precipitate produced by the second separation step is taken so as to contain solid by about 0.5 g and another specimen of the precipitate produced by the third separation step is taken so as to contain solid by about 0.5 g. Then, the both specimens are dried under reduced pressure at 30° for 18 hours and observed through a scanning electron microscope with a magnification of 50,000×. If it is confirmed by microscopic observation that a plurality of pieces of a fine particulate substance or similar fine agglomerates are adhering to the surface of the dispersible colorant and the precipitate of the second separation step and that of the third separation step have the same shape, it is judged that resin pseudo fine particles are fixed or fused to the colorant. Additionally, about a half by volume of the supernatant of the upper layer produced by the third separation step is taken from above and dried at 60° for 8 hours. Then, computationally determine the solid content on the basis of the change in the mass before and after the drying. If the solid content is smaller than 1% by mass, it is judged that no resin pseudo fine particles have left the dispersible colorant and the resin pseudo fine particles are fixed or fused to the dispersible colorant.

While the above described separation process is a preferred example for the purpose of the present invention, any separation process or method that can achieve the objectives of the above-described first to third separation steps may be used for determining the state of a dispersible colorant in accordance with the invention. More specifically, the objective of the first separation step is to separate the resin component and the water-soluble component if the ink or the aqueous dispersion product contains a colorant and a resin component adsorbed to the colorant. The objective of the second separation step is to separate the colorant and the resin component that is fixed or fused to the colorant from the resin component that is adsorbed to the colorant. The objective of the third separation step is to make sure that the resin component that is fixed or fused to the colorant does not leave the colorant. Any separation techniques including those that are known and those that are newly developed may be used for the purpose of the present invention so long as such techniques can achieve the objectives of the first to third separation steps. Additionally, the number of steps may be larger than or smaller than three.

The second characteristic feature of the present invention is that the dispersible colorant is "dispersed by itself" in a state such that chargeable resin pseudo fine particles 2-1 are fixed to the water-insoluble colorant 1 or flat chargeable resin pseudo fine particles are fused to the water-insoluble colorant 1.

As described above, the dispersible colorant in accordance with the present invention is essentially a self-dispersing colorant that ca be stably dispersed in water and in aqueous ink without using a surfactant or a polymeric dispersing agent. The definition of a self-dispersing colorant and a method of determining such a colorant will be described in greater detail below. Thus, the dispersible colorant in accordance with the invention does not require any polymeric dispersing agent or other resin components that may leave the colorant for a long period or a surfactant to be added thereto for the purpose of stabilizing the dispersion of the colorant. As a result, the present invention provides an enhanced degree of design freedom for the components other than the dispersible colorant so that, for example, it is possible to produce an aqueous ink that provides a sufficiently high image density on a recording medium where ink penetrates to a large extent such as plain paper.

The self-dispersibility of the dispersible colorant in accordance with the invention can be confirmed typically in a manner as described below. The ink or the aqueous dispersion product in which the colorant is dispersed is diluted to 10 times volume with pure water and then condensed by means of an ultra-filtration filter of a cutoff molecular weight of 50,000 to restore the original concentration. The condensate solution is subjected to a separation process using a centrifugal separator under the condition of 80,000 rpm for 90 minutes. Then, the precipitate is taken out and redispersed in pure water. If the precipitate can be redispersed well, the colorant is judged to have self-dispersibility. The well re-dispersion can be determined comprehensively by the facts that uniform dispersion can be confirmed by visual observation, that a remarkable precipitate is not produced when left to stand for one to two hours, or if any, it disappears when shaken lightly, and that when the diameters of the dispersed particles are measured by the dynamic light scattering method, the average particle diameter is not more than twice the particle diameter before the processing.

As described above, the dispersible colorant in accordance with the invention takes a form that has a high specific surface area by having chargeable resin pseudo fine particles fixed or fused the colorant, and much electric charge is carried by the wide surface to realize excellent storage stability. Therefore, chargeable resin pseudo fine particles provide a great advantage when they are fixed or fused to the colorant in a large number in a scattered manner. Particularly, it is preferable that the chargeable resin pseudo fine particles that are fixed or fused to the colorant are apart from each other by a given distance and distributed uniformly. It is more preferable that the surface of the colorant is exposed.

Such a form can be confirmed when a dispersible colorant in accordance with the invention is observed through a transmission electron microscope or scanning electron microscope. More specifically, it will be observed that a plurality of chargeable resin pseudo fine particles are fixed to the surface of the colorant and the surface of the colorant is exposed between the chargeable resin pseudo fine particles fixed to the surface. Incidentally, chargeable resin pseudo fine particles may be observed to be partly located very close to each other and in some cases fixed and fused. However, when they are separated from each other by a certain distance as a whole; the surface of the colorant is partly exposed; and such a state is distributed, it is obvious to those skilled in the art that the chargeable resin pseudo fine particles can be considered to be scattered with regard to and fixed or fused to the colorant.

For the purpose of the present invention, the surface functional group density that is attributable to the fact that the dispersible colorant has a polar group is preferably not less than 250 µmol/g but less than 1,000 µmol/g, more preferably not less than 290 µmol/g but less than 900 µmol/g in terms of mass average. If the surface functional group density is less than 250 µmol/g, it may not be possible to sufficiently maintain the dispersion stability when the dispersible colorant is stored for a long period of time. Further, if the surface functional group density is considerably larger than 1,000 µmol/g, the dispersion stability becomes sufficiently high, but there is a case where when the dispersible colorant is applied to a recording medium as an aqueous ink, the colorant can easily penetrate into the recording medium, so that it may be difficult to secure a high print density.

On the other hand, when carbon black is used for the colorant, because carbon black has a high specific gravity and hence requires a higher surface functional group density in order to sufficiently maintain the dispersion stability for a long period of time, and further because a higher black density is required on a recording medium, the surface functional group density is preferably set to be not less than 350 µmol/g but less than 800 µmol/g.

Particularly, when the surface charge of a dispersible colorant in accordance with the invention is anionic, the surface functional group density can be determined in a manner as described below. A highly excessive amount of an aqueous HCl solution is added to the dispersible colorant or aqueous ink thereof and forced to precipitate in a centrifugal separator under the condition of 20,000 rpm for 60 minutes. After the precipitate is collected and redispersed in pure water, the solid content is measured by a drying method. The redispersed precipitate is weighed and a known amount of sodium hydrogen carbonate is added. Then, the liquid containing the dispersed precipitate is stirred and subjected to a centrifugal operation in a centrifugal separator under the condition of 80,000 rpm for 2 hours for precipitation. The supernatant is weighed and titrated with 0.1 N hydrochloric acid for neutralization and the surface functional group density is determined in terms of the number of moles per 1 g of the dispersible colorant by subtracting the known amount of sodium hydrogen carbonate from the amount for neutralization. When the dispersible colorant has a cationic group as a polar group, the surface functional group density is determined following the same procedure as mentioned above with the exception that hydrochloric acid and sodium hydrogen carbonate are replaced by sodium hydroxide (NaOH) and ammonium chloride, respectively.

(2) Surface Charge of Water-Insoluble Colorant Itself

The third characteristic feature of the present invention is that a water-insoluble colorant in accordance with the invention itself has a surface charge. The expression "have a surface charge" herein employed is intended to mean that in an aqueous dispersion in which a colorant having resin pseudo fine particles fixed thereto is dispersed, the water-insoluble colorant itself is in a state in which it can disperse itself stably in water or in aqueous ink without using a surfactant or a polymeric dispersing agent, in other words, the water-insoluble colorant itself has a self-dispersibility.

Thus, according to the present invention, because not only the chargeable resin pseudo fine particles but also the water-insoluble colorant itself have a surface charge, it is possible to realize the coating effect of chargeable resin pseudo fine particles fixed or fused to a colorant, which is the above-mentioned first characteristic feature, and at the same time to control the affinity or the repulsion of the colorant relative to the surface of recording paper, which is the recording medium to be used for recording. As a result, a study conducted by the present inventors has confirmed that this characteristic feature of the present invention overcomes the problem of the known techniques of microcapsule type colorant of difficulty of realizing a desired image density due to the easy penetration/diffusion of such colorant into plain paper.

The surface charge of a water-insoluble colorant itself in accordance with the present invention is measured when the chargeable resin pseudo fine particles fixed or fused to the water-insoluble colorant in ink are forced to leave and/or become dissolved and subsequently the water-insoluble colorant is dispersed in water, which is different from that observed by adsorbing a dispersing agent such as a surfactant or a polymer resin. That is, this means that a dispersing component exists on the surface of the water-insoluble colorant in a state in which it is not easily forced to leave and/or become dissolved by an organic solvent or the like and a polar group is bonded to the surface of the water-insoluble colorant itself.

More specifically, a water-insoluble colorant in accordance with the invention is so processed as to become dispersed in such a way that a hydrophilic group is bonded to the surface of the water-insoluble colorant directly or through an atomic group. Examples of the hydrophilic group that can be used for the purpose of the present invention include anionic groups such as —COOM1, —SO$_3$M1 and —PO$_3$H(M1)$_2$ (wherein M1 represents a hydrogen atom, alkali metal, ammonium group or organic ammonium group).

Any of the above listed various hydrophilic groups may be directly bonded to the surface of the water-insoluble colorant. Alternatively, the hydrophilic group may be indirectly bonded to the surface of the pigment with interposition of an atomic group between the surface of the pigment and the hydrophilic group. In the present invention, it is preferable that the hydrophilic group is bonded to the surface of the pigment through an atomic group.

Examples of the atomic group that can be used for the purpose of the present invention include a linear or branched alkylene group having 1 to 12 carbon atoms, a substituted or unsubstituted phenylene group and a substituted or unsubstituted naphthylene group. Examples of the substituent for the phenylene and naphthylene group that can be used for the purpose of the present invention include an alkyl group (e.g., methyl group). Further, examples of the combination of the atomic group and the hydrophilic group that can be used for the purpose of the present invention include —C$_2$H$_4$—COOM1, —Ph—SO$_3$M1, —Ph—COOM1 (wherein Ph represents a phenyl group). A colorant having —COOM1 group or —SO$_3$M1 group of the above listed anionic groups is preferable because it can be dispersed well in an aqueous medium of ink.

A water-insoluble colorant having a hydrophilic group bonded directly or through an atomic group to the surface thereof as described above has the characteristic feature such that it can be dispersed in water even after forcing the chargeable resin pseudo fine particles fixed or fused to the water-insoluble colorant to leave and/or become dissolved. More specifically, it is possible to determine whether a colorant itself has a surface charge or not in a manner as described below.

A dispersible colorant or an ink in accordance with the invention is subjected to centrifugation in a centrifuge under the conditions of 12,000 rpm for 60 minutes. After the separation, the lower precipitate that contains the dispersible colorant is taken out and put into an organic solvent that can dissolve a resin such as toluene or acetone. Then, as a result, the chargeable resin pseudo fine particles that are fixed or fused to the colorant will be dissolved to leave the water-insoluble colorant and the water-insoluble colorant itself is left to exist in the organic solvent. Then, the solvent containing the water-insoluble colorant is subjected to centrifugation in a centrifuge under at 80,000 rpm to precipitate and separate the water-insoluble colorant. The obtained colorant is washed and then redispersed in pure water.

In the case of a dispersible colorant in accordance with the invention where the colorant serving as a core itself has a surface charge, it is possible to re-disperse the taken out water-insoluble colorant in the above described manner and measure the surface charge. On the other hand, in the case of a colorant prepared by adsorbing a dispersing agent such as a surfactant or polymer resin and an aqueous dispersion or ink prepared by way of a conventional microencapsulation process, the adsorbed component is dissolved to leave the water-insoluble colorant when put into an organic solvent, so that it is not redispersed in pure water and hence, it is not possible to measure the surface charge of the water-insoluble colorant itself, unlike the present invention.

For the water-insoluble colorant to be redispersed, it is naturally preferable that it takes a form of fine particles. Thus, the water-insoluble colorant in the state of fine particles has a surface charge. Having a surface charge means being positively or negatively charged. Incidentally, in a state in which a water-insoluble colorant is dispersed in water, the water-insoluble colorant is surrounded by ions of an opposite polarity that are called ion stationary phase. Furthermore, ions of a polarity opposite to that of the ion stationary phase and ions of the same polarity as of the ion stationary phase coexist at the outside of the ion stationary phase to form an area that appears like a cloud of ions. This is called a diffuse double layer, which is electrically neutral as a whole.

When a water-insoluble colorant in accordance with the invention itself is redispersed in water and a positive and negative voltage is applied to the both sides of the water dispersant, the water-insoluble colorant are attracted toward the electrode of the opposite polarity so as to move with the ion stationary phase and a part (inside of glide plane) of the diffuse double layer. Here, the electric potential of a fine particle that includes a glide plane, namely the inside of the water-insoluble colorant is referred to as zeta potential. If the water-insoluble colorant has a surface charge and hence can be dispersed, the zeta potential can be measured by some methods. On the other hand, as the zeta potential approaches zero, fine particles will aggregate, unlike the present invention.

For the purpose of the present invention, the surface charge of a water-insoluble colorant in accordance with the invention is confirmed by measuring the above described zeta potential and its value is determined by the microscopic electrophoresis. More specifically, electrophoresis begins when the water-insoluble colorant is dispersed in water and a voltage is applied thereto, and the mobility of fine particles of the water-insoluble colorant is confirmed with a microscope and the moving speed of a fine particle is determined on the basis of the moving distanced thereof. At this time, the mobility of the fine particles relates to the dielectric constant and viscosity of the measured liquid and also to the potential difference at a boundary of the moving fine particles and the liquid. At this time, the measured zeta potential is expressed by the Smoluchowski's formula:

$$\zeta = 4\pi\eta/\in \times U \times 300 \times 300 \times 1,000 \quad (1)$$

$$U \text{ (electrophoretic mobility)} = v/V/L \quad (2),$$

wherein
$\zeta$: zeta potential (unit: mV),
$\eta$: viscosity of liquid (poise),
$v$: velocity of fine particle (cm/sec),
$V$: voltage (volt),
$\in$: dielectric constant of solution
$L$: inter-electrode distance (cm)

For the purpose of the present invention, the water-insoluble colorant is redispersed in pure water and subsequently diluted with pure water to an appropriate concentration. Thereafter, while observing the moving speed of the colorant by a microscope in a state in which a constant electric field is applied thereto and the moving speed of the observed particle is metered by an image processing method.

For the purpose of the present invention, it is preferable that the zeta potential measured as the surface charge of the water-insoluble colorant itself is not less than −100 mV but no more than −15 mV in terms of a negative value and not less than 10 mV but no more than 70 mV in terms of a positive value. If the negative value is more than −15 mV, it is understood that the water-insoluble colorant does not have a surface charge to allow itself to be stably dispersed. If, on the other hand, the negative value is less than 10 mV, it is also understood that the water-insoluble colorant does not have a surface charge to allow itself to be stably dispersed. Further, setting the zeta potential or the surface charge of the water-insoluble colorant within either of the above-mentioned ranges advantageously acts on the interaction between the surface charge and the sizing agent on the surface of paper, which will be described in greater detail hereinafter. If the zeta potential is less than −100 mV or more than 70 mV, the interaction between the surface charge and the sizing agent on the surface of paper may be insufficient, so that it may become difficult to sufficiently improve the waterfastness.

(3) Interaction of Fixing or Fusion of Chargeable Resin Pseudo Fine Particles and Surface Charge of Water-Insoluble Colorant Itself In the present invention, as described above, by fixing or fusing chargeable resin pseudo fine particles to the water-insoluble colorant to attain dispersion thereof, improvement of the dispersion stability as well as improvement of the rubfastness through the bonding force of the resin component of the resin fine particles to paper can be made possible. Additionally, improvement in the absorbability of a solvent as well as the fixability resulting from capillary phenomenon of the ink solvent owing to the shape of the resin fine particles can be accomplished. Furthermore, it has been found that, without damaging such characteristics, because the water-insoluble colorant has a surface charge, the surface charge acts on a sizing agent or the like existing on the surface of plain paper and further suppresses the penetration and diffusion of the water-insoluble colorant itself into the paper, thereby making it possible to improve the image density.

Additionally, for the purpose of the present invention, it is desirable that chargeable resin pseudo fine particles are scattered and fixed or fused to the water-insoluble colorant. Particularly, it is preferable that chargeable resin pseudo fine particles having a polar group are fixed or fused to the colorant and it is desirable that the resin fine particles that are fused to the colorant are separated from each other by a certain distance so that the surface of the colorant may be partly exposed. In other words, for the purpose of the present invention, the surface of the water-insoluble colorant are not completely covered by chargeable resin pseudo fine particles because the chargeable resin pseudo fine particles are scattered and fixed or fused to the water-insoluble colorant. Therefore, some of the polar groups of the water-insoluble colorant are exposed to make the effects of the surface charge of the colorant described above more remarkable.

In other words, since chargeable resin pseudo fine particles are scattered and fixed to the water-insoluble colorant, separation of solid and liquid takes place quickly when the colorant passes through a stage where the water-insoluble colorant are absorbed quickly by the ink solvent because of the capillary phenomenon of the colorant so that the effects of the surface charge of the colorant can easily appear. Presumably, the reason is that separation of solid and liquid takes place quickly when the surface charge of the water-insoluble colorant act on the sizing agent or the like on the surface of paper so that the colorant itself is dispersed and destroyed quickly to consequently reduce the extent by which the water-insoluble colorant sinks in fibers of paper. In short, the present invention can advantageously control the image density and reduce the degree of blurring of printed characters.

Additionally, as for the fixing effect, the present inventors have conducted a study and come to find that chargeable resin pseudo fine particles are apt to stay on the surface of paper while effectively exploiting the effect of fixing and/or fusion state, and encourage the solvent, which is absorbed to fibers of paper in an accelerated manner due to separation of solid and liquid, to become separated from the water-insoluble colorant. Then, consequently the fixing effect is improved. Furthermore, the bonding force of chargeable resin pseudo fine particles that are fixed or fused to the water-insoluble colorant is boosted after fixation to provide an excellent rubfastness. Thus, while the image density, the fixability, the rubfastness develop in a contradictory manner with the conventional pigment ink and are hardly compatible, they develop in harmony with an ink in accordance with the invention. The present inventors believe that the function of chargeable resin pseudo fine particles that are fixed or fused to the water-insoluble colorant and the function of the surface condition of the water-insoluble colorant are separated from each other in such a way that they provide a synergetic effect to allow the image density, the fixability and the rubfastness to develop in a highly compatible manner.

(4) Difference between Present Methods of Producing Dispersible Colorant and Ink, and Conventional Production Methods The method of producing a dispersible colorant in accordance with the present invention is characterized by subjecting radical polymerizable monomers to aqueous precipitation polymerization by using an aqueous radical polymerization initiator in a state in which a water-insoluble colorant having at least one kind of polar groups bonded directly or through an atomic group to a surface thereof is dispersed in water and causing chargeable resin pseudo fine particles to be fixed or fused to the surface of the water-insoluble colorant.

According to the present invention, a water-insoluble colorant having at least one kind of polar groups bonded directly or through an atomic group to a surface thereof is held in a state of being dispersed well in water. Then, radical polymerizable monomers are subjected to precipitation polymerization in water by using a highly compatible aqueous radical polymerization initiator in the aqueous dispersion. The particles produced by the precipitation polymerization are polymers constituted by hydrophilic monomers and hydrophobic monomers and gradually precipitate and become fixed or fused to the hydrophobic surface of the water-insoluble colorant that are dispersed in water. The terms "fixing" and "fusion" differ from the term "adsorption" by a conventional dispersing agent such as polymer resin and mean "firm fixing". The water-insoluble colorant in accordance with the invention differs from those produced by phase conversion emulsification/microencapsulation of the conventional production methods that is conducted in a system in which a colorant is dispersed in a solvent. With the conventional production methods, a colorant is dispersed in a resin solvent solution and a base is mixed and dissolved for neutralization in order to produce a self-dispersing resin. Then, an aqueous medium that contains water as indispensable ingredient is mixed typically by dropping for emulsification, which is a so-called phase conversion emulsification. Thus, such an aqueous dispersion product remarkably differs from a product in accordance with the present invention.

According to the invention, a water-insoluble colorant having at least one kind of polar groups bonded directly or through an atomic group to a surface thereof is held in a state of being dispersed well in water and then resin is produced by precipitation polymerization. Therefore, round or flat chargeable resin pseudo fine particles are fixed or fused to the surface of the water-insoluble colorant. Thus, according to the present invention, all the production steps are conducted in water so that the resin becomes round or flat fine particles that show a high specific surface area when it covers the water-insoluble colorant. Additionally, fine particles of the resin can be made to scatter on the surface of the water-insoluble colorant. In other words, according to the invention, fine particles of the resin are sequentially formed by the above-described method so that it is possible to make them to be fixed to and cover the surface of the water-insoluble colorant, while partly exposing the surface of the water-insoluble colorant. Additionally, the scattered fine particles can be formed uniformly to a certain extent.

With conventional phase conversion emulsification methods, on the other hand, it is necessary to dry and disperse a water-insoluble colorant having at least one kind of polar groups bonded directly or through an atomic group to a surface thereof in a resin solvent solution. At this time, however, by the conventional methods, the resin can not be formed as fine particles to be fixed or fused to the surface of the water-insoluble colorant. Nor is it possible by any conventional methods to scatter the resin and make it to be fixed or fused. In other words, because of the shape of the coating, it is difficult with the conventional methods to scatter those parts having a surface charge of the water-insoluble colorant itself uniformly to a certain extent. Thus, the surface condition and the condition of the electric charge of the obtained aqueous dispersion product differ from those of the present invention.

(5) Detailed Description of Constituting Materials of Dispersible Colorant in Accordance with Present Invention and Method of Producing Same <Water-Insoluble Colorant>

Now, a water-insoluble colorant that is an indispensable ingredient of an ink to be used for ink jet recording in accordance with the present invention will be described below. Any colorant may be used that is insoluble to water and capable of having a surface charge by itself and being stably dispersed in water by fixing or fusion of chargeable resin pseudo fine particles thereto. Examples of such colorants include hydrophobic dyes, inorganic pigments, organic pigments, metal colloids and colored resin particles. The water-insoluble colorant in accordance with the invention, when dispersed to form particles, has a particle diameter of preferably not less than 0.01 µm but no more than 0.5 µm (not less than 10 nm but no more than 500 nm), more preferably not less than 0.03 µm but no more than 0.3 µm (not less than 30 nm but no more than 300 nm). A dispersible colorant whose particles have a diameter within the above identified range shows a high coloring power and a high weatherability. The above described diameter of dispersed particles is a cumulant average value of the particle diameters observed by a dynamic light scattering method.

Examples of inorganic pigments that can effectively be used as colorant for the purpose of the present invention include carbon black, titanium oxide, zinc white, zinc oxide, Tripon, iron oxide, cadmium red, molybdenum red, chrome vermillion, molybdate orange, yellow lead, chromium yellow, cadmium yellow, yellow iron oxide, titanium yellow, chromium oxide, Pyridian, cobalt green, titanium cobalt green, cobalt chromium green, deep blue, ultramarine blue, Prussian blue, cobalt blue, cerulean blue, manganese violet, cobalt violet and mica.

Examples of organic pigments that can effectively be used as colorant for the purpose of the present invention include those based on azo, azomethine, polyazo, phthalocyanine, quinacridone, anthraquinone, indigo, thioindigo, quinophthalone, benzimidazolone, isoindoline and isoindolinone.

Examples of organic water-insoluble colorants that can be used for the purpose of the present invention include hydrophobic dyes, such as those based on azo, anthraquinone, indigo, phthalocyanine, carbonyl, quinoneimine, methine, quinoline and nitro. Of these, dispersed dyes are particularly preferable. (Surface charging process for water-insoluble colorant)

For the purpose of the present invention, any of the above listed water-insoluble colorant is treated so as to have a surface charge by itself. In other words, an electric charge is bonded to the surface of the water-insoluble colorant directly or through an atomic group. The atomic group that is bonded to the surface of the water-insoluble colorant is preferably a polar group, and an anionic group or cationic group is appropriately selected as a polar group.

Examples of an anionic group include —COOM, —$SO_3M$, —$PO_3HM$, —$PO_3M_2$, —$SO_2NH_2$, and —$SO_2NHCOR$, (where M represents a hydrogen atom, alkali metal, ammonium or organic ammonium and R represents an alkyl group having 1 to 12 carbon atoms, a substituted or unsubstituted phenyl group or a substituted or unsubstituted naphthyl group). Examples of the substituent for phenyl group and naphthyl group include a linear or branched alkyl group having 1 to 6 carbon atoms. In the present invention, of the above listed groups, —COOM and —$SO_3M$ are preferable from the viewpoint of being bonded to the surface of the water-insoluble colorant.

If "M" in the above listed hydrophilic groups is an alkali metal, it may be selected from lithium, sodium and potassium. If "M" is organic ammonium, it may be selected from mono-, di-, and trimethylammonium, mono-, di-, and triethylammonium and mono-, di-, and trimethanolammonium.

As for the method of obtaining a water-insoluble colorant in the form of having an anionic surface charge, a method of oxidizing a colorant with sodium hypochlorite may be employed to introduce —COONa to the surface of colorant, although the present invention is by no means limited thereto.

Particularly, carbon black generally has a hydrophobic surface. More particularly, carbon black that is produced by way of a furnace process scarcely has hydrophilic groups such as carboxyl group and hydroxyl group on the surface of the pigment and hence the surface thereof is hydrophobic. In order to make the surface of such carbon black hydrophilic, it is preferable to impart hydroxyl group or carboxyl group to the surface by way of an oxidation process. On the other hand, of the carbon black, gas black that is available from Degussa and produced in a relatively oxygen-rich environment has hydrophilic groups on the surface thereof and may also be used for the purpose of the present invention. Examples of gas black available from Degussa include FW1, FW2 and FW200 (trade names).

The degree of oxidation of the surface of such carbon black is evaluated by the volatile content (%) of carbon black. Generally, a gas is generated when carbon black is heated to about 1,000° C. in vacuum, the type of the generated gas being dependent on the kind of the functional group existing on the surface of carbon black, so that the type and amount of the functional group on the surface can be determined by analyzing the total amount or species of the generated gas. Further, it can be seen that the larger the total weight loss on heating, the larger the amount of the hydrophilic group on the surface of the carbon.

For the purpose of the present invention, the weight loss on heating is preferably not less than 2 mass % but no more than 20 mass %. If the weight loss is less than the above lower limit, the surface of the colorant is poorly hydrophilic and hence it may not be possible to attain sufficient dispersion stability. If, on the other hand, the weight loss is more than the above upper limit, it may not be possible to obtain a sufficient image density and defects such as bleeding that damage the image quality may appear.

A technique that can be used to raise the degree of oxidation of the surface of carbon black is the use of a wet oxidation process. With this process, carbon black is immersed in an aqueous phase and an oxidizing agent such as a peroxo diacid or peroxo diacid salt is added thereto to make them react with each other at 60 to 90° C. to effect surface oxidation. More specifically, a method described in Japanese Patent Application Laid-Open No. 2003-183539 may be used for such a wet oxidation process to be conducted on carbon black. Another wet oxidation process using a hypochlorite such as sodium hypochlorite or potassium hypochlorite as described in Japanese Patent Application Laid-Open No. 2003-96372 may also be used. With this process, when a relatively hydrophilic carbon such as gas black or acid black for oxidation, more uniform oxidation can be realized.

As cationic groups, the use of quaternary ammonium group is preferable. The use of any of the quaternary ammonium groups listed below is more preferable. For the purpose of the present invention, any of the listed quaternary ammonium groups are preferably bonded to the surface of the colorant.

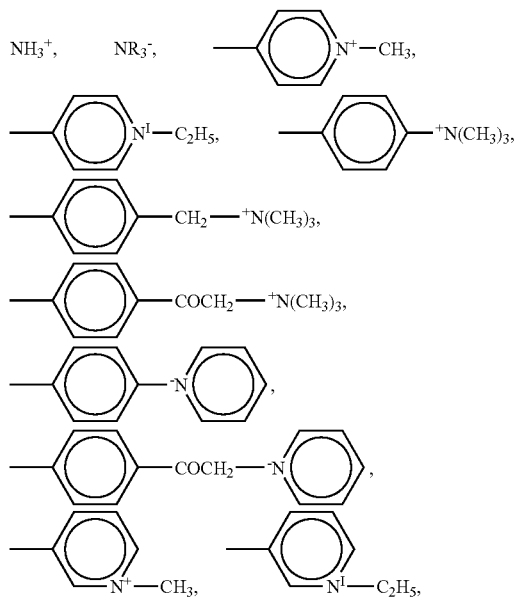

As a method for producing a water-insoluble colorant having a cationic group bonded thereto, a method of bonding N-ethylpyridyl group having a structure as described below may be used. With this method, the colorant is treated with 3-amino-N-ethylpyridiniumbromide, although the present invention is by no means limited thereto.

Further, for the purpose of the present invention, the polar group as listed above may be bonded to the surface of the pigment through an atomic group. Examples of such an atomic group include an alkyl group having 1 to 12 carbon atoms, substituted or unsubstituted phenyl group and substituted or unsubstituted naphthyl group. Examples of the above-mentioned hydrophilic group bonded to the surface of a colorant through an atomic group include —$C_2H_4COOM$, —$PhSO_3M$ and —$C_5H_{10}NH_3$, although the present invention is by no means limited thereto.

Techniques that can be used to introduce a polar group to the surface of the colorant include a method of diazotizing p-aminobenzensulfonic acid and causing it to react with the colorant, although the present invention is by no means limited thereto. For introducing a hydrophilic functional group by diazotization as described above, it is desirable that the colorant does not have any primary amine in order to suppress side reactions.

(Chargeable Resin Pseudo Fine Particles)

Chargeable resin pseudo fine particles that are another component of a dispersible colorant in accordance with the invention are defined to be micro-bodies that are substantially insoluble in water and are smaller than the colorant to which they fix or fuse and are formed by agglomerating a resin component having a sufficiently high degree of polymerization. They take a form of pseudo sphere when they are fixed whereas they take a form of pseudo ellipsoid when they are fused. Further, the sizes of a large number of chargeable resin pseudo fine particles fall within a given range. Preferably, the resin component of the chargeable resin pseudo fine particles is physically or chemically cross-linked. A technique as described below may be used to see whether the resin component of chargeable resin pseudo fine particles is cross-linked or not. The resin component constituting chargeable resin pseudo fine particles is estimated in advance by means of a known analysis method and linear chain polymers that have the same chemical structure (or the same monomer unit composition) are synthesized by solution polymerization and both the chargeable resin pseudo fine particles and the polymer are immersed in an organic solvent that dissolves the polymer well to compare them in terms of solubility. It is confirmed that the chargeable resin pseudo fine particles are internally cross-linked when the solubility of the chargeable resin pseudo fine particles is lower than that of the polymer.

Further, in another preferred manner, when the diameters of chargeable resin pseudo fine particles can be observed by, for example, a dynamic light scattering method, the average value of the diameters of dispersed particles in water is preferably not less than 10 nm but no more than 200 nm. Moreover, from the viewpoint of long-term storage stability of the dispersible colorant, it is further preferable that the polydispersity index of the dispersion particle diameters is suppressed to less than 0.2. If the average value of the diameters of dispersed particles is more than 200 nm or the polydispersity index is more than 0.2, it may not be possible to achieve the essential object of dispersing the colorant as fine particles to effect stabilization. If, on the other hand, the average value of the diameters of dispersed particles is less than 10 nm, it may not be possible to maintain the form of chargeable resin pseudo fine particles and the resin may easily become dissolved in water to make it impossible to provide the advantages of the present invention. The advantage of dispersing the colorant to effect stabilization through the fixing of chargeable resin pseudo fine particles to the colorant in accordance with the present invention is effectively realized when the average value of the diameters of dispersed particles is not les than 10 nm and not more than 200 nm and the diameters of chargeable resin pseudo fine particles are smaller than those of the colorant. The above-described preferred embodiment is applicable even when it is not possible to measure the dispersion particle diameters of chargeable resin pseudo fine particles. If such is the case, it is believed that the average diameter of chargeable resin pseudo fine particles observed with an electron microscope would fall within the above-mentioned preferred range or be in the vicinity thereof.

Further, when the colorant is an organic pigment, by setting chargeable resin pseudo fine particles to be smaller than primary particles of the pigment and larger than molecules of the pigment, in addition to falling within the above range, it is possible to obtain a dispersible colorant that is structurally highly stable and has a high dispersibility, which is preferable.

For the purpose of the present invention, the electric chargeability of chargeable resin pseudo fine particles that are fixed or fused to a water-insoluble colorant refers to a state in which they themselves have functional groups that are ionized in any form in an aqueous medium and desirably they are capable of self-dispersing due to the electric chargeability. Therefore, whether particles in question are chargeable resin pseudo fine particles or not can be determined by methods, which include one of measuring the surface zeta potential of the fine particles by means of an appropriately selected known technique, one of conducting potentiometric titration to compute the functional group density by means of a technique as will be described hereinafter, one of adding an electrolyte to an aqueous dispersion of fine particles and confirming the dependency of the dispersion stability on the concentration of the electrolyte and one of conducting a chemical structure analysis on fine particles and determining the existence/absence of ionic functional groups.

In a preferred embodiment, chargeable resin pseudo fine particles can be obtained by having a polar group. Chargeable resin pseudo fine particles provide a high degree of self-dispersion stability because of having a polar group. The polar group is desirably an anionic group or cationic group. Further, it is preferable that the polar group that chargeable resin pseudo fine particles have and the polar group that is chemically bonded to the water-insoluble colorant have the same polarity. Thereby, in a state in which the water-insoluble colorant is stably dispersed, chargeable resin pseudo fine particles will not repel each other but will be firmly fixed to the water-insoluble colorant. Moreover, an aqueous dispersion in which chargeable resin pseudo fine particles are fixed or fused to a colorant can exist stably.

Here, the resin component constituting the chargeable resin pseudo fine particles is not limited, and may be selected from any natural or synthetic polymeric compound, and the polymeric compound newly developed for the present invention. Those useful for the resin component for the present invention include acrylic, styrene/acrylic, polyester, polyurethane and polyurea resin, and polysaccharides and polypeptides. In particular, polymers and copolymers of monomers having a radically polymerizable unsaturated bond, into which acrylic resin and styrene/acrylic resin are classified, are preferably used because they can be generally used and easily processed to design functions of the pseudo-fine, chargeable particles.

The monomers having a radically polymerizable unsaturated bond (hereinafter referred to as "radically polymerizable monomers" or simply to "monomers") preferably used for the present invention include hydrophobic monomers, such as (meth)acrylic esters, e.g., methyl acrylate, ethyl acrylate, isopropyl acrylate, n-propyl acrylate, n-butyl acrylate, t-butyl acrylate, benzyl acrylate, methyl methacrylate, ethyl methacrylate, isopropyl methacrylate, n-propyl methacrylate, n-butyl methacrylate, iso-butyl methacrylate, t-butyl methacrylate, tridecyl methacrylate and benzyl methacrylate; styrene-based monomers, e.g., styrene, α-methylstyrene, o-methylstyrene, m-methylstyrene, p-methylstyrene and p-tert-butylstyrene; itaconic acid esters, e.g., benzyl itaconate; maleic acid esters, e.g., dimethyl maleate; fumaric acid esters, e.g., dimethyl fumarate; and acrylonitrile, metahcrylonitrile and vinyl acetate. The expression "(meth) acrylic acid" herein employed refers to both methacrylic acid and acrylic acid.

Further, the following compounds falling into the category of hydrophilic monomers are also preferably used; monomers having an anionic group, such as those having carboxylic group, e.g., acrylic acid, methacrylic acid, crotonic acid, ethacrylic acid, propyl acrylate, isopropyl acrylate, itaconic acid, fumaric acid and a salt thereof; those having sulfonic acid group, e.g., styrene sulfonate, 2-propylacrylamide sulfonate, acrylic acid-2-ethyl sulfonate, methacrylic acid-2-ethyl sulfonate, butylacrylamide sulfonate and a salt thereof; and those having phosphonic acid group, e.g., methacrylic acid-2-ethyl phosphonate and acrylic acid-2-ethyl phosphonate. Of these, use of acrylic acid and methacrylic acid are more preferable.

Moreover, those monomers having a cationic group include those having primary amino group, e.g., aminoethyl acrylate, aminopropyl acrylate, amide methacrylate, aminoethyl methacrylate, aminopropyl methacrylate; those having secondary amino group, e.g., methylaminoethyl acrylate, methylaminopropyl acrylate, ethylaminoethyl acrylate, ethylaminopropyl acrylate, methylaminoethyl methacrylate, methylaminopropyl methacrylate, ethylaminoethyl methacrylate and ethylaminopropyl methacrylate; those having tertiary amino group, e.g., dimethylaminoethyl acrylate, diethylaminoethyl acrylate, dimethylaminopropyl acrylate, diethylaminopropyl acrylate, dimethylaminoethyl methacrylate, diethylaminoethyl methacrylate, dimethylaminopropyl methacrylate and diethylaminopropyl methacrylate; those having quaternary ammonium group, e.g., chloride salt of dimethylaminoethylmethyl acrylate, chloride salt of dimethylaminoethylmethyl methacrylate, chloride salt of dimethylaminoethylbenzyl acrylate, chloride salt of dimethylaminoethylbenzyl methacrylate; and vinyl imidazoles.

Moreover, those falling into the category of nonionic, hydrophilic monomers include a compound having in its structure both radically polymerizable, unsaturated bond and hydroxyl group, which shows strong hydrophilicity. They include hydroxyethyl (meth)acrylate and hydroxypropyl (meth)acrylate. Other known or novel oligomers and macromonomers of various types can be used without any limitation.

Particularly, it is preferable to form chargeable resin pseudo fine particles by using a copolymer of monomer components including at least one kind of the above-mentioned hydrophobic monomers and at least one kind of the above-mentioned hydrophilic monomers from the viewpoint of obtaining an ink for aqueous ink jet recording having more suitable printing characteristics. More specifically, when preparing resin fine particles, the various characteristics of the resin fine particles that are fixed to the surface of a colorant can be appropriately controlled by means of a variety of control factors such as the type and concentration of the polymerization initiator used and the type and copolymerization ratio of the constituent monomers. At this time, it is possible to provide good fixing ability to the water-insoluble colorant and good thermal stability by constituting the chargeable resin pseudo fine particles by use of at least one kind of the above-mentioned hydrophobic monomers, whereas it is possible to provide excellent shape controllability and good dispersion stability by constituting the chargeable resin pseudo fine particles by use of at least one kind of the above-mentioned hydrophilic monomers. Therefore, it is possible to obtain resin fine particles that are always fixed to the colorant firmly and shows excellent dispersion stability by using such monomers at the same time. Furthermore, when the above-described requirements are met, by appropriately selecting the kinds of monomers for forming the resin fine particles and the copolymerization ratio of the monomers, it is possible to provide a water-insoluble colorant in accordance with the invention and/or the resin fine particles fixed to the colorant with additional functionalities.

Further, it is also preferred to contain, as the hydrophilic monomer, at least a monomer having a methyl group at the a position and also a radically polymerizable, unsaturated double bond. By fixing to the colorant resin fine particles formed by using a radically polymerizable monomers having a methyl group at the a position, especially in the thermal ink jet system adapted to eject ink by a thermal energy, the ejectability of the aqueous ink-jet recording ink containing a water-insoluble colorant becomes excellent. While the reason for this is not clear, it is presumed that because resin formed by using a radically polymerizable monomer having a methyl group at the a position will be depolymerized at a high temperature, application of a thermal energy to the ink depolymerizes the resin constituted by the monomer component having a methyl group at the a position so that clagging to the inside of the ink ejection port becomes difficult to occur.

Further, when flat chargeable resin pseudo fine particles are to be fused to a colorant, it is desirable to constitute them by a copolymer of monomer components including at least one kind of the above-mentioned hydrophobic monomers, at least one kind of the above-mentioned nonionic hydrophilic monomers and at least one kind of the above-mentioned anionic and cationic hydrophilic monomers. At this time, it is possible to provide good fusion to the water-insoluble colorant and good thermal stability by constituting the chargeable resin pseudo fine particles by use of at least one kind of the above-mentioned hydrophobic monomers; it is possible to provide a flat, spherical shape of chargeable resin pseudo fine particles and good dispersion stability by constituting the chargeable resin pseudo fine particles by use of at least one kind of the above-mentioned nonionic hydrophilic monomers; and it is possible to provide good dispersion stability by constituting the chargeable resin pseudo fine particles by use of at least one kind of the above-mentioned anionic and cationic hydrophilic monomers.

Further, it is also preferable to contain, as the hydrophobic monomer, at least an acrylic acid alkyl ester compound and a methacrylic acid alkyl ester compound (hereinafter, referred to as "(meth)acrylic acid alkyl ester compound"). The (meth)acrylic acid alkyl ester compounds has good adhesion to a hydrophobic surface of a water-insoluble colorant and at the same time are highly copolymerizable with the hydrophilic monomers to give rise to desirable effects from the viewpoint of uniformity of the surface properties of the resin fine particles and uniform fixing ability and fusion to the water-insoluble colorant.

Moreover, it is especially preferable to contain at least one of benzyl methacryate and methyl methacrylate of the above listed preferable hydrophobic monomers. In addition to the above described reasons that such monomers are preferable, the above two monomers provide resin fine particles with good thermal resistance and good transparency so that an ink for aqueous ink jet recording that contains a water-insoluble colorant having such resin fine particles fixed thereto shows excellent color developability.

When flat chargeable resin pseudo fine particles are to be fused to a colorant, there can also be used without limitation nonionic hydrophilic monomers including those having a radically polymerizable unsaturated bond and a highly hydrophilic hydroxyl group at the same time in the chemical structure thereof such as hydroxyethyl(meth)acrylate and hydroxypropyl(meth)acrylate and those containing an alkylene oxide group such as methoxypolyethyleneglycol(meth) acrylate, ethoxymethoxypolyethyleneglycol(meth)acrylate, polyethyleneglycol(meth)acrylate and polypropylene(meth) acrylate, and other various known and novel oligomers and macromonomers. Particularly, monomers containing an alkylene oxide group have excellent copolymerizability with the above-mentioned hydrophobic monomers and provide chargeable resin pseudo fine particles with uniform surface property and good fusion to a colorant, so that the use of such monomers is preferable.

While it is possible to control the properties of the water-insoluble colorant in accordance with the present invention and/or the chargeable resin pseudo fine particles that are fixed or fused to the colorant by appropriately selecting the kinds of monomers constituting the chargeable resin pseudo fine particles such as hydrophobic monomers and hydrophilic monomers as mentioned above and the copolymerization ratio thereof, it is also preferable to control the glass transition temperature of the copolymers contained in the chargeable resin pseudo fine particles so as to be not less than −40° C. but no more than 60° C. when the chargeable resin pseudo fine particles are fixed to the colorant. Further, it is also preferable to control the glass transition temperature of the copolymers so as to be not less than −100° C. but no more than 0° C. when the flat chargeable resin pseudo fine particles are fused to the colorant. When the glass transition temperature is controlled so as to fall within the above described ranges, the chargeable resin pseudo fine particles that are fixed or fused to the colorant can be made to have a desired shape and can also be fused to the colorant more firmly.

To obtain such chargeable resin pseudo fine particles, it is preferable to select and use monomers that are known to provide a homopolymer having a low glass transition temperature, of the above listed preferable groups of monomers. For example, it is preferable to use n-butyl acrylate and acrylic acid as monomers at an appropriate ratio. It is also preferable to use ethyl methacrylate and methacrylic acid as monomers at an appropriate ratio. Particularly, when flat chargeable resin pseudo fine particles are formed and fused to a water-insoluble colorant, it is preferable to select and use monomers that are known to provide a homopolymer having a low glass transition temperature, of the above listed preferable groups of monomers. For example, as the hydrophobic monomers, there are included those represented by the formula (1):

$$CH_2=CR-COOC_nH_{(2n+1)} \qquad (1)$$

wherein R is H or $CH_3$ and n is defined by $3 \leq n \leq 10$.

Preferred examples of such hydrophobic monomers include propyl(meth)acrylate, isopropyl(meth)acrylate, n-butyl(meth)acrylate, t-butyl(meth)acrylate, isobutyl(meth) acrylate, pentyl(meth)acrylate, hexyl(meth)acrylate, heptyl (meth)acrylate, octyl(meth)acrylate, nonyl(meth)acrylate, decyl(meth)acrylate, 2-ethylhexyl(meth)acrylate, 2-ethylbutyl(meth)acrylate, dodecyl(meth)acrylate, 3,3-dimetyl-2-butyl(meth)acrylate, 1,1-diethylpropyl(meth)acrylate, isodecyl (meth)acrylate and 1-methylbutyl(meth)acrylate. Examples of such hydrophilic monomers include those containing an alkylene oxide group as described above.

The glass transition temperature of chargeable resin pseudo fine particles can be measured by means of conventional differential scanning calorimetry. For the purpose of the present invention, DSC822e (trade name) manufactured by Mettler-Toledo International Inc. can be used for such measurement. The water-insoluble colorant having fixed or fused thereto such resin fine particles containing copolymers having a glass transition temperature as defined above can form a film together with adjacent colorant to produce a firmly bonded colored film because of the high film forming property given to the chargeable resin pseudo fine particles. Therefore, such colorant can produce a printed matter showing good rubfastness not only on plain paper but also on a glossy medium that is disadvantageous in terms of rubfastness.

When a pigment is used as the water-insoluble colorant for the purpose of the present invention, it is preferable to set the ratio of the chargeable resin pseudo fine particles to the pigment (resin mass/pigment mass; hereinafter referred to as B/P) within the range of 0.1 to 4.0 from the viewpoint of improving the rubfastness of a printed matter. By adopting the B/P ratio of not less than 0.1, it is possible to improve the adhesion between the colorants and the adhesion between the colorant and a recording medium, thereby providing the printed matter with excellent rubfastness. Particularly, when the water-insoluble colorant having fixed or fused thereto the resin fine particles containing copolymers having a glass transition temperature as described above is used, it is possible to effectively exploit the film forming property to consequently improve the rubfastness of an image printed by using the colorant on glossy paper. When the B/P ratio is remarkably greater than 4.0, an ink with a high viscosity will be produced to affect the ejection stability when used for ink jet recording. Additionally, since the amount of the resin is extremely larger than the amount of the colorant, the color developability of the colorant on a recording medium may be lowered to make it difficult to provide a sufficient print density of a printed matter. By setting the B/P ratio within the range of 0.1 to 4.0 and utilizing the correlation with the surface charge of the colorant, it is possible to provide an aqueous ink for ink jet recording which has both excellent rubfastness and excellent ejection stability. Incidentally, although the term "resin mass" herein employed refers to the total amount of resin fine particles that are contained in an aqueous ink for ink jet recording in accordance with the invention, it may also include the resin that is apparently firmly adsorbed to the surface of the colorant. However, it does not include a water-soluble resin component that can be easily separated from the colorant.

The above-defined B/P ratio can be determined generally by differential thermogravimetry. For the purpose of the present invention, TGA/SDTA851 (trade name) manufactured by Mettler-Toledo International Inc. is used for observations and computations. More specifically, an aqueous ink for ink jet recording is subjected to centrifugation under the conditions of 80,000 rpm for 2 hours and the obtained precipitate is dried, weighed and subjected to temperature rise in a nitrogen atmosphere or in the atmosphere to determine the change in the mass of the colorant and that of the resin component before and after being subjected to the decomposition temperature and compute the B/P ratio.

When chargeable resin pseudo fine particles are constituted by a copolymer of polymer components including at least one kind of the above-mentioned hydrophobic monomers and at least one kind of the above-mentioned hydrophilic monomers, it is preferable that the at least one kind of hydrophilic monomer includes at least one kind of anionic monomer. Particularly, it is possible to introduce a greater number of anionic groups to the chargeable resin pseudo fine particles when the hydrophilic monomer includes an anionic monomer. Thus, this technique can be used effectively to control the surface functional group density of the colorant to the preferable value as described above. Additionally, by including an anionic monomer, it is possible to obtain a dispersible colorant that shows a high dispersion stability, especially, in a high pH region to a medium pH region.

While the anionic monomer is not limited so long as the monomer has a function group that is anionic in water, but acrylic acid, methacrylic acid, p-styrene sulfonate and their salts are preferably used from the viewpoint of copolymerizability with other monomer components, general purpose properties and strong anionic property.

It is preferable that the hydrophilic monomers of the above copolymer include a cationic monomer from the viewpoint of preparing a dispersible colorant that has high dispersion stability, especially in a medium pH region to a low pH region. While any cationic monomer can be used for the purpose of the present invention so long as they have a functional group that is cationic in water, the monomers having a cationic group mentioned above of the radically polymerizable monomers as described above are preferably used.

(Synthesis of Chargeable Resin Pseudo Fine Particles and Fixing or Fusion to Water-Insoluble Colorant)

The chargeable resin pseudo fine particles can be synthesized and caused to be fixed or fused to a water-insoluble colorant by following the process and the technique of any known general method of synthesizing self-dispersing chargeable resin pseudo fine particles and those of any known method of compounding self-dispersing resin fine particles and a colorant.

However, as a result of intensive studies, the present inventors have come to invent a simple and easy method of producing a dispersible colorant containing a colorant having a surface charge and chargeable resin pseudo fine particles smaller than the colorant, characterized in that the chargeable resin pseudo fine particles are fixed or fused to the colorant. Now, the method of producing a dispersible colorant in accordance with the invention will be described below.

As a result of the studies conducted by the present inventors, it has been found that a water-insoluble colorant dispersed by itself with chargeable resin pseudo fine particles being fixed or fused thereto can be produced in a simple and easy way by applying aqueous precipitation polymerization technique. Namely, an aqueous dispersion in which a water-insoluble colorant carrying a surface charge on the surface thereof is dispersed in water is obtained by the above described production method. Then, chargeable resin pseudo fine particles are made to be fixed or fused to the colorant by way of a step in which radically polymerizable monomers are subjected to aqueous precipitation polymerization, using an aqueous radical polymerization initiator in the aqueous dispersion. As a result of conducting this step, the chargeable resin pseudo fine particles synthesized in the aqueous precipitation polymerization process become to be firmly fixed to the colorant uniformly and scatteredly, thereby showing excellent dispersion stability by itself. As described above, the characteristics of the chargeable resin pseudo fine particles can be controlled in a desired, simple and easy manner in the above described aqueous precipitation polymerization process and the chargeable resin pseudo fine particles can be successfully made to be fixed or fused to the colorant in this step. Now, the above-described production method will be described in greater detail by way of preferred embodiments.

(Dispersion of Water-Insoluble Colorant)

Firstly, an aqueous dispersion in which a water-insoluble colorant carrying a surface charge on the surface thereof is dispersed in water is prepared so as to be advantageously used for the purpose of the present invention. When preparing the aqueous dispersion, the colorant is treated so as to carry a surface charge as described above. More specifically, a charge carrying member is bonded to the surface of the water-insoluble colorant directly or through an atomic group so as to stably disperse the colorant in water as shown in FIG. 2B.

In the process of forming an aqueous dispersion of an water-insoluble colorant as described above, the colorant is dispersed such that the average value of the dispersion particle diameter is preferably within the range of not less than 0.01 μm and not more than 0.5 μm (not less than 10 nm and not more than 500 nm), more preferably within the range of not less than 0.03 μm and not more than 0.3 μm (not less than 30 nm and not more than 300 nm). Because the dispersion particle diameters in this process are reflected significantly to the dispersion particle diameters of the dispersible colorant obtained, the above-described ranges are preferable from the viewpoint of the coloring power, weatherability of an image and dispersion stability.

The dispersion particle diameters of a water-insoluble colorant in accordance with the invention are preferably distributed to show a monodispersion. Although the particle diameter distribution of a dispersible colorant having chargeable resin pseudo fine particles fixed or fused thereto generally tends to be narrower than the particle diameter distribution of the aqueous dispersion obtained before the polymerization step illustrated in FIG. 2B, it basically depends on the particle diameter distribution of the aqueous dispersion. Additionally, also in order to surely effect the fixing of the chargeable resin pseudo fine particles to the colorant through hetero aggregation, it is important to narrow the particle diameter distribution of the colorant. According to the studies conducted by the present inventors, it has been found that the obtained dispersible colorant shows excellent dispersion stability when the polydispersity index of the colorant is within the range of 0.25 or less.

The diameters of dispersed particles of a colorant can vary among various measuring methods, and in particular, an organic pigment is rarely dispersed in the form of spherical particles. In the present invention, the diameters of particles of a colorant are measured on the basis of the principle of the dynamic light scattering method, using ELS-800 (trade name) manufactured by Otsuka Electronics Co., Ltd, and then the average particle diameter and the polydispersity index that are determined by cumulant analysis are used.

(Radical Polymerization Initiator)

For the purpose of the present invention any general, water-soluble radical polymerization initiators may be used. Specific examples of such water-soluble radical polymerization initiators include persulfates. Alternatively, a redox initiator prepared by combining a water-soluble radical polymerization initiator and a reducing agent may also be used. More specifically, the initiator is designed and used so as to attain an optimal combination, taking the characteristics of the colorant, monomers and the like as described above into consideration. It is desirable to select a polymerization initiator that provides a group thereof with the same electric charge as the surface characteristics of the water-insoluble colorant to be obtained by fixing or fusing chargeable resin pseudo fine particles thereto. For example, when a water-insoluble colorant having an anionic group is to be obtained, it is possible to efficiently obtain a surface charge by selectively using a polymerization initiator which provides a neutral or anionic group. Similarly, when a water-insoluble colorant having a cationic group is to be obtained, it is preferable to select a polymerization initiator which provides a neutral or cationic group.

(Radically Polymerizable Monomers)

The radically polymerizable monomer to be used in the present invention form chargeable resin pseudo fine particles by way of aqueous precipitation polymerization process. Such radically polymerizable monomers may be appropriately selected by considering the characteristics of the chargeable resin pseudo fine particles to be obtained and the characteristics of the aqueous dispersion obtained by fixing the chargeable resin pseudo fine particles to the surface of a water-insoluble colorant. For a production method in accordance with the invention, any radically polymerizable monomers including those that are known and those that are newly developed for the purpose of this invention may be used. More specifically, monomers having a radically polymerizable unsaturated bond may preferably be used.

(Aqueous Precipitation Polymerization)

Now, a preferable mode of carrying out a process of aqueous precipitation polymerization, which is a step of synthesizing chargeable resin pseudo fine particles and causing them to be fixed to a water-insoluble colorant, will be described below. FIGS. 2A, 2B, 2C and 2D are schematic illustrations of typical steps of a production method in accordance with the invention, showing the flow of operation of the method. Firstly, as shown in FIG. 2A, an aqueous dispersion is prepared by dispersing a water-insoluble colorant 1 in an aqueous solution by means of a dispersing agent 3. Then, the dispersion shown in FIG. 2A is subjected to temperature rise with stirring, and monomer components 4 are added therein typically along with an aqueous solution of an aqueous radical polymerization initiator 5 (see FIG. 2B). The added aqueous radical polymerization initiator is dissociated by the temperature rise to generate radicals, which then participate in a reaction of hydrophobic monomers dissolved in a small amount in the aqueous phase and water-soluble monomers in the aqueous phase, of the monomer components contained in the dispersion. As the reaction proceeds, oligomers that are generated by the polymerization reaction of the monomers become water-insoluble and precipitate from the aqueous phase. Since the oligomers precipitated at this time do not have sufficient dispersion stability, they will unite with each other to form self-dispersing resin fine particles (see FIG. 2C).

Figure 3:
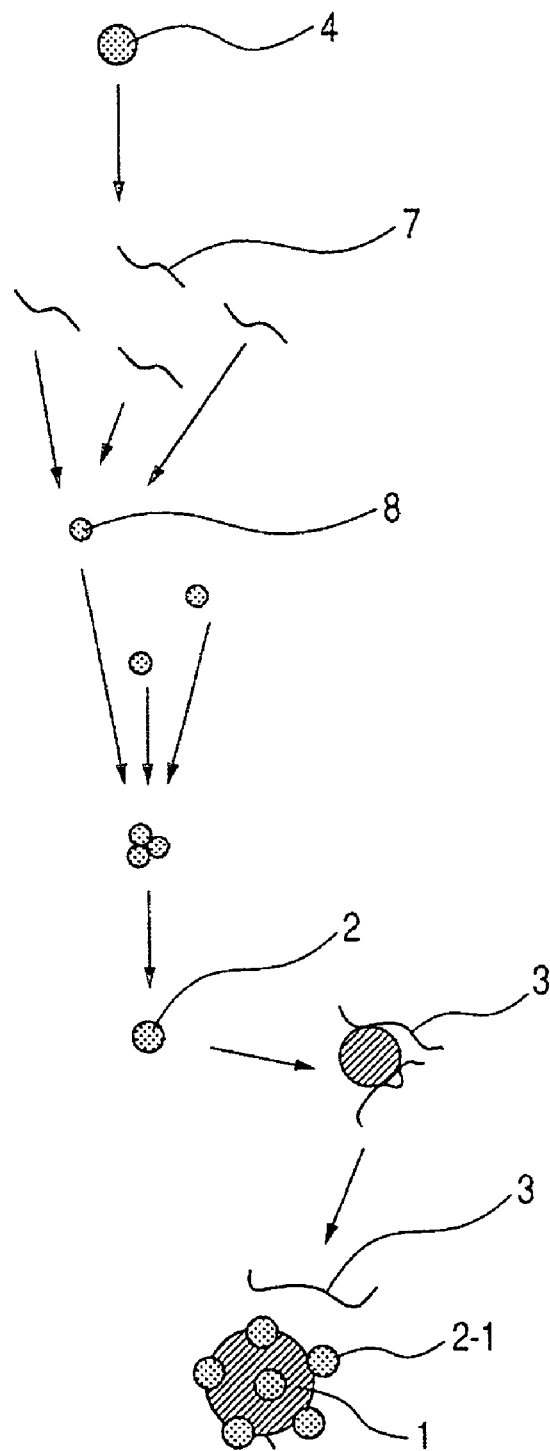
FIG. 3 is a schematic illustration showing how chargeable resin pseudo fine particles are refined and fixed or fused to a colorant by a production method in accordance with the invention.

FIG. 3 schematically illustrates the process of polymerization of monomers 4 and formation of a dispersible colorant. As described above, as the reaction of monomers 4 progresses, oligomers 7 formed by the polymerization reaction of the monomer components becomes water-insoluble and precipitate from the aqueous phase (8 in FIG. 3). Since the oligomers of the precipitate 8 do not have sufficient dispersion stability, they unite with each other to form chargeable resin pseudo fine particles 2 having a sulfonic acid group. The chargeable resin pseudo fine particles 2 further effect hetero aggregation, utilizing the hydrophobic surface of the colorant 1 in the aqueous dispersion solution as a seed so that the surface of the colorant strongly adsorb the resin component constituting the chargeable resin pseudo fine particles 2 by a hydrophobic interaction. At this time, the polymerization reaction is still progressing inside of the chargeable resin pseudo fine particles 2 to increase the number of adsorption spots on the surface of the colorant 1 and change themselves so as to take a shape that is more stable in terms of energy. At the same time, physical crosslinks are formed inside of the chargeable resin pseudo fine particles to a high degree so that the chargeable resin pseudo fine particles take a fixed state in which they are most stably adsorbed by the colorant 1 to thereby become a fixing state. On the other hand, the colorant 1 is stabilized as a plurality of chargeable resin pseudo fine particles are fixed thereto so that the dispersing agent 3 that has been in an equilibrium state leaves from the surface of the colorant (see FIG. 2D and lowermost part of FIG. 3).

The self-dispersing resin fine particles are further stabilized by effecting hetero aggregation, utilizing the water-insoluble colorant that is dispersed in the aqueous solution as a seed. Thus, a water-insoluble colorant to be used for the purpose of the present invention is obtained in a form in which a plurality of chargeable resin pseudo fine particles 6 are fixed or fused to a single dispersion unit of the colorant.

Additionally, in this process in which the precipitation involved in polymerization and the fixing or fusion to the colorant proceed simultaneously, because the self-dispersing resin fine particles aggregate at a stage in which they still do not have sufficient dispersion stability, strong inter-molecular force and hydrophobic interaction are applied between the chargeable resin pseudo fine particles and the colorant so that the chargeable resin pseudo fine particles are adsorbed more stably to the surface shape of the colorant to thereby become firmly fixed or fused to the colorant. Thus, the water-insoluble colorant is easily formed by way of the above process (see FIG. 2D).

While the conditions for the polymerization reaction may vary depending on the properties of the polymerization initiator to be used and those of the monomers, the reaction temperature is not more than 100° C., preferably within the range of 40 to 80° C. and the reaction time is not less than 1 hour, preferably 6 to 30 hours. It is desirable that the materials that participate in the reaction are stirred at a rate of 50 to 500 rpm, preferably 150 to 400 rpm. A protective colloid substance for the chargeable resin pseudo fine particles may be preliminarily put into a polymerization system in a small amount, depending on the properties of the polymerization initiator, the monomers and the water-insoluble colorant. This may make it possible to adjust the particle diameters of the chargeable resin pseudo fine particles small. An example of such a protective colloid material is a water-soluble polymer resin. With a method of producing a dispersible colorant in accordance with the invention, the colorant itself has such a surface charge as to enable stable dispersion, so that the above step can be conducted essentially without requiring the use of a surfactant or a polymer dispersing agent. However, it has been found that the sizes of the chargeable resin pseudo fine particles that are to be fixed to the colorant can be reduced and uniformed and, at the same time, favorable results are obtained from the viewpoint of increasing the ratio of resin mass/pigment mass, i.e., the B/P ratio, when a water-soluble polymer resin is added into the polymerization system as described above before or during the aqueous precipitation polymerization process of radically polymerizable monomers using an aqueous radical polymerization initiator. The amount of such a water-soluble polymer resin added is preferably 0.05 to 5 mass %, more preferably 0.1 to 2 mass % on the basis of the aqueous dispersion product.

Particularly, a polymer dispersing agent is preferably used which has a sufficient water solubility and has a hydrophobic portion functioning as an adsorption site to a surface of a colorant and an oil drop interface of a radically polymerizable monomer, particularly a hydrophobic monomer added in the polymerization step. Further, it is more preferable from the viewpoint of easily inducing the chargeable resin pseudo fine particles to become fixed to the colorant in the subsequent polymerization step that at least one kind of the hydrophobic monomers to be used in the subsequent polymerization step exists as a unit of the dispersing agent. For the purpose of the present invention, any methods of producing a polymer dispersing agent and method of producing water-soluble polymers may be used without limitation. For example, both a polymer dispersing agent and a water-soluble polymer can be produced by causing monomers having an ionic group selected from the resin monomer components of the chargeable resin pseudo fine particles and other polymerizable monomers to react with each other in a non-reactive solvent in the presence or absence of a catalyst.

Particularly, it has been found that favorable results can be obtained by using a dispersing agent selected from styrene/acrylic polymer compounds that are obtained by polymerizing ionic-group-containing monomers and styrene monomers as indispensable components and ionic-group-containing acrylic polymer compounds that are obtained by polymerizing ionic-group-containing monomers and (meth)acrylate monomers having 5 or more carbon atoms as indispensable components. At this time, it is preferable to select an anionic dispersing agent when the dispersible colorant to be obtained is expected to have an anionic group, whereas it is preferable to select a cationic or anionic dispersing agent when the dispersible colorant to be obtained is expected to have a cationic group.

In the above-described process of aqueous precipitation polymerization, it is desirable to use an anionic polymer dispersing agent showing an acid value not less than 100 but no more than 250 or a cationic polymer dispersing agent showing an amine value not less than 150 but no more than 300. If the acid value or the amine value is less than the corresponding lower limit value, there may be occasions where chargeable resin pseudo fine particles do not easily fix to the colorant because the affinity between the hydrophobic monomers and the dispersing agent is too high so that chargeable resin pseudo fine particles are strongly adsorbed to the dispersing agent and hardly become fixed to the colorant in the aqueous precipitation polymerization process. If, on the other hand, the acid value or the amine value is more than the corresponding upper limit value, the excluded volume effect and the electrostatic repulsive force of the dispersing agent become too strong around the colorant so that there may be occasions where chargeable resin pseudo fine particles are prevented from fixing to the colorant. When an anionic dispersing agent is used, it is preferable to select a dispersing agent having a carboxyl group as an anionic group so as not to prevent resin fine particles from fixing to the colorant.

When obtaining chargeable resin pseudo fine particles by polymerizing monomer components including at least one kind of hydrophobic monomer and at least one kind hydrophilic monomer in the above described step, it is preferable to add drowise the monomer components into the aqueous dispersion of the water-insoluble colorant that contains an aqueous radical polymerization initiator. To uniformly obtain desired self-dispersing resin fine particles from a mixture of monomers having different properties such as a hydrophobic monomer and a hydrophilic monomer, it is desirable to always maintain the mixing ratio of the monomers having different properties at a constant level. When such a mixture of monomers is added to the polymerization system excessively relative to the amount of monomers that are to be consumed within a predetermined period of time by a polymerization reaction, monomers of a specific kind are polymerized prematurely and the remaining monomers start to be polymerized when the former monomers are consumed by the polymerization. Then, the properties of the produced chargeable resin pseudo fine particles become remarkably nonuniform. Then, of the generated chargeable resin pseudo fine particles, those containing a hydrophilic monomer component to a large extent may not be fixed to the surface of the water-insoluble colorant. Further, the resin component containing a hydrophilic monomer component to a large extent may not precipitate but remain as a water-soluble resin component in the system without forming chargeable resin pseudo fine particles because of their strong hydrophilicity. On the other hand, when the monomer components are dropped into the aqueous dispersion of a water-insoluble colorant that contains an aqueous radical polymerization initiator, the polymerization ratio of the hydrophobic monomer and hydrophilic monomer is always maintained at a constant level so that it is possible to uniformly obtain chargeable resin pseudo fine particles showing a desired polymerization ratio.

Particularly, when anionic monomers such as acrylic acid, methacrylic acid and the like are added into the polymerization system as hydrophilic monomers, there may be cases where they become partially unstable and aggregate depending on the characteristics of the surface of the water-insoluble colorant to which polar groups are bonded to shave an electric charge. In order to prevent such a situations it is preferable to neutralize the anionic monomers in advance and add them as sodium salt or potassium salt.

When preparing an ink for ink jet recording by using the water-insoluble colorant having chargeable resin pseudo fine particles fixed or fused thereto in accordance with the invention, an additional refining process may be conducted in order to eliminate resin fine particles that have not been fixed to the water-insoluble colorant, unreacted monomers and impurities. Such a process may be selected from known general refining methods for the above-described purpose. Examples of such methods include centrifugation methods and refining methods employing an ultrafiltration technique.

With the above-described process, it is possible to form resin fine particles of desired copolymers on the surface of a water-insoluble colorant by controlling a number of control factors. Particularly, when anionic monomers are used for the purpose of achieving a high degree of dispersion stability, it is possible to provide a water-insoluble colorant in accordance with the invention and prepared by way of the above described process with a high degree of dispersion stability if anionic monomers are used in the above described process even in a relatively small amount. Thus, it is possible to improve the dispersion stability of the water-insoluble colorant without affecting the waterfastness thereof. While the reason for this is no understood, it has been found as a result of the studies conducted by the present inventors that, when polymerization is started by radicals generated in water and oligomers precipitate to form chargeable resin pseudo fine particles, those part having more components derived from the anionic monomers will orient predominantly at the side of the aqueous phase, i.e., near the surfaces of chargeable resin pseudo fine particles. The present inventors presume that this state is maintained after the chargeable resin pseudo fine particles have been fixed or fused to the surface of the colorant so that further more anionic groups derived from anionic monomer components are present on the surface of the colorant in accordance with the invention that have a large specific surface area because of their structures and consequently the colorant having the chargeable resin pseudo fine particles are fixed or fused thereto are stabilized with a relatively small number of anionic monomer components.

(6) Ink and Ink Set

An aqueous ink in accordance with the invention is characterized by containing a dispersible colorant as described above. When the colorant is a pigment, the content of the pigment on the basis of the ink is not less than 0.1 mass % but no more than 20 mass %, preferably not less than 0.3 mass % but no more than 15 mass %.

Now, the components of an ink in accordance with the invention other than the aqueous dispersion product and an ink set will be described below. An aqueous liquid medium to be used for the purpose of the present invention preferably contains water as a principal ingredient and it is desirable that the water content in the ink relative to the total mass of the ink is between 10 and 95 mass %, preferably between 25 and 93 mass %, more preferably between 40 and 90 mass %. Water to be used for the purpose of the present invention is preferably ion exchange water.

While water may be used singly as aqueous liquid medium in an ink in accordance with the invention, it is possible to make the advantages of the present invention more remarkable by using water and a water-soluble organic solvent as aqueous liquid medium. Examples of water-soluble organic solvents that can be used for the purpose of the present invention include alkyl alcohols having 1 to 5 carbon atoms such as methyl alcohol, ethyl alcohol, n-propyl alcohol, isopropyl alcohol, n-butyl alcohol, sec-butyl alcohol, tert-butyl alcohol, isobutyl alcohol and n-pentanol, amides such as dimethylformamide and dimethylacetoamide, ketones and keto-alcohols such as acetone and diacetone alcohol, ethers such as tetrahydrofuran and dioxane, oxyethylene- or oxypropylene-addition polymers such as diethylene glycol, triethylene glycol, tetraethylene glycol, dipropylene glycol, tripropylene glycol, polyethylene glycol and polypropylene glycol, aklylene glycols having 2 to 6 carbon atoms such as ethylene glycol, propylene glycol, trimethylene glycol, butylene glycol, pentanediol and hexylene glycol, triols such as glycerin, trimethylol ethane, trimethyrol propane and 1,2,6-hexanetriol, thiodiglycol, bishydroxyethylsulfone, lower alkylglycolethers such as ethyleneglycolmonomethyl(ethyl and butyl)ether, diethyleneglycolmonomethyl(ethyl and butyl)ether and triethyleneglycolmonomethyl(ethyl and butyl)ether, lower dialkylglycolethers such as triethyleneglycoldimethyl(ethyl) ether and tetraethyleneglycoldimethyl(ethyl)ether, alkanol amines such as monoethanol amine, diethanolamine and triethanol amine, sulfolane, N-methyl-2-pyrrolidone, 2-pyrrolidone and 1,3-dimethyl-2-imidazolidinone. A water-soluble organic solvent selected from the above listed ones may be used singly or in combination.

It is desirable that the content of the water-soluble organic solvent in the ink relative to the total mass of the ink is generally not more than 50 mass %, preferably between 5 and 40 mass %, more preferably between 10 and 30 mass %. Of the above listed solvents, the use of ethylene glycol, diethylene glycol, triethylene glycol, 2-pyrrolidone, glycerin, polyethylene glycol and/or 1-2-6-hexanetriol is preferable.

An ink in accordance with the invention may be further provided with desired performances, as needed, by adding a surfactant, an anti-foaming agent, a surface tension regulator, a pH regulator, a viscosity regulator, a preservative, an antioxidant, an evaporation accelerator, an antirust agent, an antifungal agent, a chelating agent, or the like. When adding a surfactant, a nonionic surfactant may be added to regulate the surface tension and to improve the ejectability. Preferable examples of nonionic surfactants include polyoxyethylenealkylether, polyoxyethylenealkylphenylether, polyoxyethylene fatty acid ester, sorbitan fatty acid ester, polyoxyethylenesorbitan fatty acid ester and ethyleneoxide adduct of acetylene glycol. The HLB value of the added surfactant is preferably not less than 10, more preferably not less than 12 and most preferably not less than 15. The amount of addition of such a surfactant is preferably not less than 0.3 mass %, more preferably not less than 0.5 mass %, most preferably not less than 0.8 mass % on the basis of the total mass of the ink in order to obtain the effect of continuation of ejection. On the other hand, when the content of the additive is too large, the ink shows an excessive viscosity. Therefore, the amount of addition of the surfactant is preferably not more than 3 mass %, more preferably not more than 2.5 mass %, most preferably not more than 2.0 mass % on the basis of the total mass of the ink.

Further, there may exist chargeable resin pseudo fine particles (A) that are fixed or fused to the colorant and self-dispersing resin fine particles (B) that are disperse in the ink. When monomer components that constitute the chargeable resin pseudo fine particles (A) and monomer components that constitute the self-dispersing resin fine particles (B) both include one or more common monomer components, the affinity between the dispersible colorant having the chargeable resin pseudo fine particles (A) fixed thereto and the self-dispersing resin fine particles (B) is increased to improve the adhesive and provide an effect of improving the rubfastness of a printed image particularly on a glossy medium.

It is preferred that the viscosity of an ink in accordance with the invention is within the range of 0.7 to 12 mPa·s at 25° C. When the viscosity of ink is within the above-described range, the ink is ejected normally in ink jet recording and penetrates quickly into the recording medium because of its viscosity resistance so that the fixability is not affected. The surface tension of an ink in accordance with the invention is preferably so regulated as to be within the range of 20 to 60 mN/m at 25° C. When the surface tension is not less than 20 mN/m, because a power to pull back a meniscus after liquid droplets has been ejected for ink jet recording is strong or when a meniscus is projected, a power to pull back the meniscus is relatively strong, a problem of taking in a foam or wetting an orifice to give rise to deflection does not arise. Thus, an ink in accordance with the invention and having the above described composition provides advantages including a high waterfastness of a printed image, a high storability of ink, an excellent recording density, a good fixability, a high printing quality and a high fixing performance as ink to be used for ink jet recording on plain paper.

While an aqueous ink in accordance with the invention and having the above-described composition may be used as ink for stamps and pens, it is particularly effective when it is used for ink jet recording. The known ink jet recording methods include a recording method of applying a mechanical energy to ink to eject liquid droplets and a method of applying a thermal energy to ink to cause bubble formation to thereby eject liquid droplets and an ink in accordance with the invention can highly suitably be used for such ink jet recording methods.

An ink set in accordance with the invention may be a black ink set or a color ink set (of various colors including yellow, magenta, cyan, red, blue, green, orange, violet and so on) and is characterized by containing at least an ink in accordance with the invention. In other words, all inks of an ink set may be inks in accordance with the invention or one of inks of an ink set (e.g., black ink) may be an ink in accordance with the invention while the other inks may be prepared by using dyes as colorants. The inks may be selected and combined appropriately depending on the use thereof.

(7) Recorded Image, Image Recording Method and Recording Apparatus (Recorded Image)

An ink jet recorded image in accordance with the invention is formed on a recording medium by using an aqueous ink in accordance with the invention and an ink jet recording apparatus in accordance with the invention as will be described hereinafter. Any recording mediums including those adapted to be used for ink jet recording may be used for the purpose of. the present invention without limitation.

(Image Recording Method and Recording Apparatus)

A dispersible colorant and an aqueous ink in accordance with the invention can be used with ink jet ejection type heads. An ink in accordance with the invention may be housed in ink tanks and may also be used effectively to refill ink tanks. Particularly, the present invention provides advantages to the Bubble Jet® registered trade type recording heads and recording apparatus among various ink jet recording systems.

The representative structure and working principle are preferably based on the basic principle disclosed in U.S. Pat. Nos. 4,723,129 and 4,740,796. This principle is applicable to an on-demand or continuous type. It is particularly effective when applied to an on-demand type, where at least one driving signal is transmitted to an electrothermal converter placed in a position corresponding to each of a sheet and liquid passage by which the ink is held to rapidly heat the ink to a temperature beyond the nucleate boiling temperature, the converter being sufficiently generating heat to cause film boiling on the heated recording head surface, with the result that the bubbles are formed in the ink corresponding to the signal. The ink is ejected through an ejection port by the actions of the bubbles growing and contracting to form at least one droplet. The pulsed signal is more preferable, because it can immediately and adequately cause growth and contract of the bubbles to achieve ink eject of high response. U.S. Pat. Nos. 4,463,359 and 4,345,262 disclose the preferable pulsed signals. The recording can be performed more effectively under the conditions disclosed by U.S. Pat. No. 4,313,124 describes the temperature rising rate on the heat-working surface in the head.

The preferable head structures include combinations of ejection ports, liquid passages (linear or right angle to liquid passages) and electrothermal converters, as disclosed by the above USP specifications. The present invention is also effective in a structure with the components positioned on the curved heat-working surface, as disclosed by U.S. Pat. Nos. 4,558,333 or 4,459,600. It is also effective in another structure with plural 2 electrothermal converters sharing one or more common ink ejection ports and their own ejection ports, as disclosed by Japanese Patent Application Laid-Open No. S59-123670.

Further, a full-line type recording head, which covers a length corresponding to the maximum width over which the recorder can produce images, may have a combination of a plurality of recording heads disclosed by the above specifications to cover the required length, or may be of such a structure that they are assembled in one body. The present invention helps these types exhibit the above-described effect more efficiently.

In addition, the present invention is also effective when fixed to an exchangeable chip type recording head body in which it can be electrically connected to the body to supply ink therefrom, and also to a cartridge type in which it is integrally mounted on the recording head itself. Moreover, the present invention can exhibit its effect more efficiently, when provided, as one component to the recording head, with a recovery unit or another auxiliary means, which is still another advantage of the present invention. More specifically, these include capping, cleaning and pressurizing or inducing means, electrothermal converter or another heating device, preliminary heating means comprising a combination of these devices, and a combination of these devices for a preliminary eject mode which is not for recording.

EXAMPLES

The present invention will be described in more detail with reference to EXAMPLES and COMPARATIVE EXAMPLES, which by no means limit the present invention, and various modifications may be made so long as they are within the scope of the present invention. In EXAMPLES and COMPARATIVE EXAMPLES, "part(s)" and "%" are by mass unless otherwise stated.

Examples 1 to 4

Colorant 1, Colorant 2, Colorant 3, and Colorant 4 used as water-insoluble colorants in the following examples and comparative examples are listed below. Dispersible colorants and aqueous inks for ink jet recording in accordance with the invention were prepared by using Colorant 1 through Colorant 4 in Examples 1 to 4.

Colorant 1: C. I. Pigment Black (Cabojet 300 (trade name), available from Cabot Corporation: self-dispersing pigment/carboxylic acid groups)

Colorant 2: C. I. Pigment Blue 15:3 (Cabojet 253 (trade name), available from Cabot Corporation: self-dispersing pigment/sulfonic acid groups)

Colorant 3: C. I. Pigment Red 122 (Cabojet 266 (trade name), available from Cabot Corporation: self-dispersing pigment/sulfonic acid groups)

Colorant 4: C. I. Pigment Yellow 74 (Cabojet 273 (trade name), available from Cabot Corporation: self-dispersing pigment/sulfonic acid groups)

Example 1

Recording ink 1 was prepared in Example 1 in a manner as described below. Firstly, Pigment dispersion liquid 1 was obtained to prepare black ink by adding water so as to contain Colorant 1 by 10 parts in terms of solid content. Particles of pigment of an average particle diameter of 97 nm were in a stably dispersed state in the obtained Pigment dispersion liquid 1. The polydispersity index was 0.18. Then, 100 parts of Pigment dispersion liquid 1 was heated to 70° C. in a nitrogen atmosphere and each of the three liquids listed below was filled in a dropping apparatus and dropped into the Pigment dispersion liquid 1, while the latter was being agitated by means of a motor, for polymerization for 5 hours. The three liquids were (1) 5.5 parts of methacrylic acid, (2) 0.5 part of acrylic acid, 0.12 part of potassium hydroxide and 20 parts of water and (3) 0.05 part of potassium persulfate and 20 parts of water. The obtained dispersion liquid was diluted to 10 times volume with water and subjected to centrifugation at 5,000 rpm for 10 minutes to remove aggregated components.

At this time, the quantity of surface oxygen of carbon black was observed for Colorant 1 by means of the method as described below. The quantity of surface oxygen of carbon black was measured by a heating loss method as described below. The carbon black was heated to 950° C. for about 10 minutes in vacuum and the quantity of surface oxygen was estimated on the basis of the weight loss produced as a result of the heating. The gases that are generated under the above conditions are carbon monoxide and carbon dioxide derived from carboxyl group, hydroxyl group, quinone, and so on that exist on the carbon surface. In other words, it can be said that the larger the heating loss, the larger the quantity of surface oxygen. It was found by the measurement that the heating loss was 10 mass %.

Subsequently, Dispersible colorant 1 was obtained as precipitate by subjecting the dispersion liquid further to centrifugation at 12,500 rpm for 2 hours. Then, Dispersible colorant 1 was dispersed in water and subjected to centrifugation at 80,000 rpm for 90 minutes and the precipitate was redispersed in water, dried and observed through a scanning electron microscope JSM-6700 (trade name; available from JEOL High-Tech Co., Ltd.) at a magnification of 50,000× to find that resin pseudo fine particles were fixed to the surface of carbon black of Dispersible colorant 1. Then, the dispersion liquid was subjected to centrifugation at 80,000 rpm for 90 minutes to find that the solid content of the supernatant was not more than 1 mass %. It was confirmed that Dispersible colorant 1 had chargeable resin pseudo fine particles smaller than the colorant fixed thereto. Incidentally, the forms of the colorants obtained in the following examples were also confirmed by means of the same technique.

Another dispersible colorant was prepared by way of the same process as described above and subjected to centrifugation at 12,000 rpm for 60 minutes in a centrifugal separator. After the separation, the precipitate of a lower layer that contains the colorant was taken out and put into toluene for dissolution. Then, the dissolved product was subjected to centrifugation at 80,000 rpm in a centrifugal separator to precipitate and separate the water-insoluble colorant. The colorant was washed and redispersed in pure water to find that it was dispersed well without producing any precipitate. The same process was used for the colorants of the following examples to confirm that they carried surface charge and could be dispersed by themselves. The zeta potential was measured by the method described below for evaluation. The results are shown in Table 1.

The ingredient as listed below were added to the obtained Dispersible colorant 1 and mixed until the concentration of the colorant in ink became 4%. Then, it was subjected to filtration under pressure by using a membrane filter with a pore size of 2.5 μm to prepare Recording Ink 1 of this example. Water was used to regulate the ink to obtain 100 parts of the ink as in the following examples.

| | |
|---|---|
| glycerin | 7 parts |
| diethylene glycol | 5 parts |
| trimethylolpropane | 7 parts |
| Acetylenol EH (trade name; available from Kawaken Fine Chemicals, Co. Ltd. | 0.2 part |
| ion exchange water | balance |

Example 2

Recording Ink 2 of Example 2 was prepared in a manner as described below. Firstly, in order to prepare a cyan ink, Colorant 2 was dispersed in water in an amount of 10 parts in terms of solid content to obtain Pigment dispersion liquid 2. The obtained Pigment dispersion liquid 2 had an average particle diameter of 123 nm and was in a stably dispersed state, and the polydispersity index was 0.20. Then, Dispersible colorant 2 was obtained following the same procedure as in Example 1. The state of fixing of chargeable resin pseudo fine particles to colorant of the obtained dispersible colorant was observed and confirmed and the dispersibility of the colorant itself was observed as in Example 1.

Example 3

Recording Ink 2 of Example 3 was prepared in a manner as described below. Firstly, in order to prepare a magenta ink, Colorant 3 was dispersed in water in an amount of 10 parts in terms of solid content to obtain Pigment dispersion liquid 3. The obtained Pigment dispersion liquid 3 had an average particle diameter of 127 nm and was in a stably dispersed state, and the polydispersity index was 0.22. Then, Dispersible colorant 3 was obtained following the same procedure as in Example 1. The state of fixing of chargeable resin pseudo fine particles to colorant of the obtained dispersible colorant was observed and confirmed and the dispersibility of the colorant itself was observed as in Example 1.

Example 4

Recording Ink 4 of Example 4 was prepared in a manner as described below. Firstly, in order to prepare an yellow ink, Colorant 2 was dispersed in water in an amount of 10 parts in terms of solid content to obtain Pigment dispersion liquid 4. The obtained Pigment dispersion liquid 4 had an average particle diameter of 115 nm and was in a stably dispersed state, and the polydispersity index was 0.17. Then, Dispersible colorant 4 was obtained following the same procedure as in Example 1. The state of fixing of chargeable resin pseudo fine particles to colorant of the obtained dispersible colorant was observed and confirmed and the dispersibility of the colorant itself was observed as in Example 1.

Examples 5 to 10

Dispersible colorants and inks were prepared by using the colorant of Example 1, by use of monomer mixture solutions of different kinds, blends or preparation conditions.

Example 5

100 parts of Pigment dispersion liquid 1 prepared as in Example 1 were taken and heated to 70° C. in a nitrogen atmosphere and each of the three liquids listed below was filled in a dropping apparatus and dropped into the Pigment dispersion liquid 1 to effect polymerization with stirring by means of a motor for 8 hours. The three liquids were (1) 5.7 parts of styrene, (2) 0.3 part of acrylic acid, 0.07 part of potassium hydroxide and 20 parts of water and (3) 0.05 part of potassium persulfate and 20 parts of water. The obtained dispersion liquid was subjected to centrifugation for refinement as in Example 1 to obtain Dispersible colorant 5. The obtained Dispersible colorant 5 was made to have a concentration of 4% as in Example 1 to prepare Recording Ink 5 of this example.

Example 6

100 parts of Pigment dispersion liquid 1 prepared as in Example 1 were taken and heated to 70° C. in a nitrogen atmosphere and each of the three liquids listed below was filled in a dropping apparatus and dropped into the Pigment dispersion liquid 1 to effect polymerization with stirring by means of a motor for 6 hours. The three liquids were (1) 5.7 parts of methyl methacrylate, (2) 0.3 part of acrylic acid, 0.07 part of potassium hydroxide and 20 parts of water and (3) 0.05 part of potassium persulfate and 20 parts of water. After polymerization for 6 hours, the obtained dispersion liquid was subjected to centrifugation for refinement as in Example 1 to obtain Dispersible colorant 6.

Additionally, 100 parts of 2% aqueous solution of a styrene/acrylic acid type resin dispersing agent as used in Example 1 and an equivalent amount of potassium hydroxide were used instead of Pigment dispersion liquid 1 and subjected to polymerization. The obtained dispersion liquid was subjected to centrifugation for refinement at 20,000 rpm for 1 hour to obtain resin fine particles B1. Formulation was performed as in Example 1 such that the concentrations of the obtained Dispersible colorant 6 and the resin fine particles B1 were 4% and 1.2%, respectively, thereby preparing Recording Ink 6 of this example.

Example 7

100 parts of Pigment dispersion liquid 1 prepared as in Example 1 were taken and heated to 70° C. in a nitrogen atmosphere and each of the three liquids listed below was filled in a dropping apparatus and dropped into the Pigment dispersion liquid 1 to effect polymerization with stirring by means of a motor for 6 hours. The three liquids were (1) 4.5 parts of benzyl methacrylate and 1.2 parts of butyl acrylate, (2) 0.3 part of acrylic acid, 0.07 part of potassium hydroxide and 20 parts of water and (3) 0.05 part of potassium persulfate and 20 parts of water. The obtained dispersion liquid was subjected to centrifugation for refinement as in Example 1 to obtain Dispersible colorant 7.

Additionally, substitution similar to that of Example 6 was carried out to effect polymerization, followed by centrifugation for refinement to obtain resin fine particles B2. When observed as in Example 1, it was confirmed that resin pseudo fine particles were fixed to the surface of carbon black in Dispersible colorant 7 but a larger amount of resin pseudo fine particles were fused to the surface of carbon black than in Example 1. Formulation was performed as in Example 1 such that the concentrations of the obtained Dispersible colorant 7 and the resin fine particles B2 were 4% and 1.2%, respectively thereby preparing Recording Ink 7 of this example.

Example 8

100 parts of Pigment dispersion liquid 1 prepared as in Example 1 were taken and heated to 70° C. in a nitrogen atmosphere and each of the three liquids listed below was filled in a dropping apparatus and dropped into the Pigment dispersion liquid 1 to effect polymerization with stirring by means of a motor for 5 hours. The three liquids were (1) 17.2 parts of methyl methacrylate, (2) 0.8 part of sodium p-styrenesulfonate and 20 parts of water and (3) 0.05 part of potassium persulfate and 20 parts of water. After the polymerization process of 5 hours, the obtained dispersion liquid was subjected to centrifugation for refinement as in Example 1 to obtain Dispersible colorant 8. Formulation was performed as in Example 1 such that the concentration of the obtained Dispersible colorant 8 was 4% to prepare Recording Ink 8 of this example.

Example 9

100 parts of Pigment dispersion liquid 1 prepared as in Example 1 were taken and heated to 70° C. in a nitrogen atmosphere and each of the three liquids listed below was filled in a dropping apparatus and dropped into the Pigment dispersion liquid 1 to effect polymerization with stirring by means of a motor for 5 hours. The three liquids were (1) 4.0 parts of butyl acrylate and 1.5 parts of methoxypolyethyleneglycol monomethacrylate (molecular weight: about 1,100; trade name: M230G; available from Shin-Nakamura Chemical Co., Ltd.), (2) 0.5 part of acrylic acid, 0.35 part of potassium hydroxide and 20 parts of water and (3) 0.05 part of potassium persulfate and 20 parts of water. After the polymerization process of 5 hours, the obtained dispersion liquid was subjected to centrifugation for refinement as in Example 1 to obtain Dispersible colorant 9. When observed in the same manner as described in Example 1, it was confirmed that flat and spherical chargeable resin pseudo fine particles were fused to the surface of carbon black and the chargeable resin pseudo fine particles were smaller than the carbon black. Formulation was performed as in Example 1 such that the concentration of the obtained Dispersible colorant 9 was 4% to prepare Recording Ink 9 of this example.

Example 10

100 parts of Pigment dispersion liquid 1 prepared as in Example 1 were taken and heated to 70° C. in a nitrogen atmosphere and each of the three liquids listed below was filled in a dropping apparatus and dropped into the Pigment dispersion liquid 1 to effect polymerization with stirring by means of a motor for 8 hours. The three liquids were (1) 3.0 parts of benzyl methacrylate and 2.5 parts of methoxypolyethyleneglycol monomethacrylate (molecular weight: about 500; trade name: M230G; available from Shin-Nakamura Chemical Co., Ltd.), (2) 0.5 part of acrylic acid, 0.35 part of potassium hydroxide and 20 parts of water and (3) 0.05 part of potassium persulfate and 20 parts of water. After the polymerization process, the obtained dispersion liquid was subjected to centrifugation for refinement as in Example 1 to obtain Dispersible colorant 10. Formulation was performed as in Example 1 such that the concentration of the obtained Dispersible colorant 10 was 4% to prepare Recording Ink 10 of this example.

Comparative Example 1

A recording ink of Comparative Example 1 was prepared in a manner as described below. An ink was prepared by using a conventional self-dispersing pigment. A pigment dispersion liquid prepared as in Example 1 was used and formulation was performed as in Example 1 such that the concentration of the pigment was 4% to prepare the recording ink of this comparative example without subjecting the pigment dispersion liquid to a polymerization process.

Comparative Example 2

A recording ink of Comparative Example 2 was prepared in a manner as described below. An ink was prepared by using a pigment dispersed with a conventional polymer resin dispersing agent. A mixture liquid of a composition of 10 parts of carbon black (Black Pearls 880 (trade name) available from Cabot Corporation, U.S.A.), 6 parts of glycerin, 10 parts of a styrene/acrylic acid type resin dispersing agent and 74 parts of water was dispersed at 1,500 rpm for 5 hours by means of a sand mill available from Kaneda Scientific Co., Ltd., to obtain a pigment dispersion liquid. At this time, the quantity of surface oxygen of carbon black was measured by means of a heating loss method as described below. With this technique, the carbon black was heated to 950° C. for about 10 minutes in vacuum and the quantity of surface oxygen was estimated on the basis of the weight loss produced as a result of the heating. The gases that are generated under the above conditions are carbon monoxide and carbon dioxide derived from carboxyl group, hydroxyl group, quinone, and so on that exist on the carbon surface. In other words, it can be said that the larger the heating loss, the larger the quantity of surface oxygen. It was found by the measurement that the heating loss was 1.5 mass %. At the time of dispersing using a sand mill, zirconia beads with a diameter of 0.6 mm were used and the pot was filled by 70%. The styrene/acrylic acid type resin dispersing agent used had a copolymerization ratio of 70:30, Mw=8,000 and an acid value of 170. The styrene/acrylic acid type resin dispersing agent was used in a form of an aqueous solution thereof prepared by adding thereto water and potassium hydroxide in an amount equivalent to the above acid value, followed by stirring at 80° C. The obtained pigment dispersion liquid was in a stably dispersed state with an average dispersion particle size of 98 nm and the polydispersity index was 0.16. Formulation was performed as in Example 1 such that the concentration of the pigment was 4% to prepare the recording ink of this comparative example.

Comparative Example 3

A recording ink of Comparative Example 3 was prepared in a manner as described below by means of a microencapsulation method using a conventional phase conversion emulsification process. Firstly, a mixture liquid containing 175 parts of n-butyl methacrylate, 10.5 parts of n-butyl acrylate, 37.5 parts of β-hydroxyethyl methacrylate, 26.8 parts of methacrylic acid and 20 parts of t-butyl peroxyoctoate was prepared and added dropwise into 250 parts of methyl ethyl ketone heated to 75° C. with stirring in a nitrogen atmosphere for 2 hours, and a react was allowed to proceed for 15 hours while the temperature was maintained, thereby preparing a resin solution. Then, 11.6 parts of the resin solution was taken and 1.6 parts of diethanolamine and 30 parts of carbon black (Black Pearls 880 (trade name) available from Cabot Corporation, U.S.A.) were added thereto to make the total amount equal to 150 parts, to which 500 g of zirconia beads with an average particle diameter of 0.5 mm was added. Then, the mixture was kneaded in a paint shaker for 4 hours. Finally, the zirconia beads were filtered off to obtain a dispersion liquid of resin and pigment.

Thereafter, 1N hydrochloric acid was added dropwise while adding pure water for dilution to double volume with stirring until the colorant was coated with the resin. Incidentally, the pH at this time was 3 to 5. Then, the liquid was subjected to suction filtration and the salt was rinsed with water to obtain a hydrous cake. A 10% aqueous solution of diethanolamine was added thereto so as to adjust the pH within a range of 8.5 to 9.5. After further stirring for 1 hour, a pigment dispersion liquid was formulated so as to have a colorant concentration of 10%. The obtained pigment dispersion liquid was in a stably dispersed state with an average dispersion particle size of 98 nm and the polydispersity index was 0.16. Formulation was performed as in Example 1 such that the concentration of the pigment was 4% to prepare the recording ink of this comparative example.

Comparative Example 4

A recording ink of Comparative Example 4, which was a mixture ink, was prepared in a manner as described below by using a conventional self-dispersing pigment and a pigment obtained by a conventional microencapsulation method utilizing a phase conversion emulsification process. The pigment dispersion liquid prepared in Comparative Example 1 and the pigment dispersion liquid prepared in Comparative Example 3 were formulated as in Example 1 such that the concentrations of the respective pigments were 2%, that is, the total pigment concentration was 4% to prepare a recording ink of this comparative example.

Comparative Example 5

A recording ink of Comparative Example 5 was prepared in a manner as described below using a pigment obtained by coating a conventional self-dispersing pigment through a microencapsulation method utilizing a conventional phase conversion emulsification process. Firstly, Pigment dispersion liquid 1 of Example 1 was dried at 90° C. in an oven to produce powder. Then, a mixture liquid containing 175 parts of n-butyl methacrylate, 10.5 parts of n-butyl acrylate, 37.5 parts of β-hydroxyethyl methacrylate, 26.8 parts of methacrylic acid, and 20 parts of t-butyl peroxyoctoate was prepared and added dropwise into 250 parts of methyl ethyl ketone heated to 75° C. with stirring in a nitrogen atmosphere for 2 hours, and a react was allowed to proceed for 15 hours while the temperature was maintained, thereby preparing a resin solution. Then, 11.6 parts of the resin solution was taken and 1.6 parts of diethanolamine, and 30 parts of carbon black obtained by drying were added thereto to make the total amount equal to 150 parts, to which 500 g of zirconia beads with an average particle diameter of 0.5 mm was added. Then, the mixture was kneaded in a paint shaker for 4 hours. Finally, the zirconia beads were filtered off to obtain a dispersion liquid of resin and pigment.

Thereafter, 1N hydrochloric acid was added dropwise while adding pure water for dilution to double volume with stirring until the colorant was coated with the resin. Incidentally, the pH at this time was 3 to 5. Then, the liquid was subjected to suction filtration and the salt was rinsed with water to obtain a hydrous cake. A 10% aqueous solution of diethanolamine was added thereto so as to adjust the pH within a range of 8.5 to 9.5. After further stirring for 1 hour, a pigment dispersion liquid was formulated so as to have a colorant concentration of 10%. The obtained pigment dispersion liquid was in a stably dispersed state with an average dispersion particle size of 98 nm and the polydispersity index was 0.16. Formulation was performed as in Example 1 such that the concentration of the pigment was 4% to prepare the recording ink of this comparative example.

[Evaluation]

(Characteristics of Dispersible Colorants)

The dispersible colorants or the colorants constituting the pigment dispersion liquids (hereinafter, referred to as dispersible colorant) obtained in Examples 1 to 10 and Comparative Examples 1 to 5 were observed and their physical properties were measured in a manner as described below. The obtained results are shown in Tables 1 to 3.

<Results of Observation and Scattering State>

Each of the dispersible colorants was dispersed in water and dried and then observed through a scanning electron microscope JSM-6700 (trade name; available from JEOL HighTech Co., Ltd.) at a magnification of 50,000×. Colorants in which resin particles were found to be fixed or fused to the surface of carbon black were rated as o, whereas those in which resin particles were not found to be fixed or fused to the surface of carbon black were rated as x. Further, colorants in which resin particles were found to be scattered were rated as o and those in which resin particles were found to be localized or nonuniformly fused were rated as x to thereby evaluate the scattering state. Additionally, the state of fixing or fusion was observed.

<Dispersion Stability>

A 5% aqueous dispersion liquid of each of the dispersible colorants was diluted to 10 times volume with pure water and then concentrated by means of an ultrafiltration filter of a cutoff molecular weight of 50,000 to the original concentration. The concentrate was subjected to a separation process using a centrifuge under the conditions of 12,000 rpm for 2 hours. Then, the precipitate as separated was taken out and redispersed in pure water. The redispersion was rated as o for self-dispersibility when the precipitate was confirmed by visual observation to be dispersed well and the average particle diameter measured by a dynamic light scattering method described below was not more than twice the particle diameter before the processing, whereas the redispersion was rated as x when such conditions were not met.

<Confirmation of Presence/Absence of Charge on Colorant Surface and Measurement of Zeta Potential>

Each of the dispersible colorants was dispersed in water and subjected to centrifugation at 12,000 rpm for 60 minutes with a centrifuge. After the separation, the precipitate of a lower layer containing the colorant was taken out and put into toluene for dissolution. Then, the solution was subjected to centrifugation at 80,000 rpm with a centrifuge to precipitate and separate the water-insoluble colorant. The colorant was cleaned and redispersed in pure water to confirm presence/absence of any precipitate. A redispersion in which no precipitate was found was rated as o, whereas one in which any precipitate was found was rated as x. Each of the redispersions in which no precipitate was found was then diluted to about 100,000 times volume with pure water and the value of ζ potential on a stationary surface of a cell was measured for 100 particles by means of ZEECOM (trade name; available from Microtec Co., Ltd.), and an average value thereof was defined to be ζ potential of the colorant. Additionally, a standard deviation of the values measured for the 100 particles was determined.

<Average Dispersion Particle Diameter>

Each of the dispersible colorants was measured by a dynamic light scattering method, using ELS-800 (trade name; available from OTSUKA ELECTRONICS CO., LTD.), and a cumulant average of the measured particle diameters was defined as an average particle diameter of the colorant.

<Glass Transition Temperature: Tg (° C.)>

The glass transition temperature of the resin fine particles fixed to each of the dispersible colorants was determined by drying the dispersible colorant, followed by measurement by means of DSC822e (trade name; available from Mettler-Toledo International Inc.).

<Surface Functional Group Density>

The surface functional group density of each dispersible colorant was determined by the following procedure. The aqueous dispersion of the dispersible colorant was diluted with a highly excessive amount of hydrochloric acid (HCl), and centrifugally treated at 20,000 rpm for 1 hour. The resulting precipitate was redispersed in pure water, and its solid content was determined. The precipitate was weighed and then a known amount of sodium hydrogencarbonate was added thereto, followed by stirring to prepare a dispersion liquid, which was further centrifugally treated at 80,000 rpm for 2 hours for precipitation. The supernatant solution was weighed, and titrated with 0.1 N hydrochloric acid for neutralization to determine the surface functional group density by subtracting the known sodium hydrogencarbonate amount and a blank value with pure water from the amount for neutralization. When the dispersible colorant was known to have a cationic group as a polar group, the surface functional group density was determined in a similar manner with the exception that hydrochloric acid and sodium hydrogencarbonate were replaced by sodium hydroxide (NaOH) and ammonium chloride, respectively.

(Evaluation Procedures for Recording Ink and Evaluation Results)

Each of the recording inks prepared in the above-described manner was used for printing on a recording medium by means of an ink jet recording apparatus and the obtained image was evaluated. As an ink jet recording apparatus, an ink jet printer BJS700 (trade name; available from Canon Inc.) was used for forming an image. At this time, the black ink was filled in a tank for BCI-3eBk (trade name), while the cyan, magenta and yellow inks were filled in tanks of the respective colors and set in position. The printed matter was evaluated for optical density (OD), rubfastness, marker resistance and ejection stability in a manner as described below. Additionally, the long term storage stability of each of the inks was confirmed. The obtained results are shown in Tables 4 to 6.

<Optical Density (OD)>

A Black text was printed on Canon's PPC sheets by using the respective recording inks. After the printed matter was allowed to stand for one day, the optical density (OD) of each of the obtained printed image was measured. The printed matters were rated as A when the OD thereof was not less than 1.4, as B when the OD thereof was not less than 0.8 and less than 1.4 and as C when the OD thereof was less than 0.8. However, as for Examples 2, 3 and 4, cyan, yellow and magenta texts were printed respectively instead of the black text and the optical densities of the respective colors were measured. The printed matter was rated as A when the OD thereof was not less than 1.0.

<Rubfastness>

As for the rubfastness of each of the printed matters, the printed part thereof was rubbed five times with silbon paper under application of a load of 40 g/cm². Then, the printed part was visually observed for disturbances and evaluated based on the following evaluation standard.

A: No printed letters were disturbed by the rubbing and there was no staining of a blank part.

B: Practically no printed letters were disturbed by the rubbing and there was practically no staining of a blank part, which was negligible.

C: The printed letters were greatly disturbed by the rubbing and staining of a blank part was observed.

<Marker Resistance>

As for the marker resistance of each of the printed matters, a line was drawn on the printed letters with a fluorescent yellow marker pen (Zebra Optics), and the printed letters were visually observed for disturbances and evaluated based on the following evaluation standard.

A: No printed letters were disturbed by the drawing.

B: Practically no printed letters were disturbed by the drawing and the pen tip was substantially unstained.

C: The printed letters were greatly disturbed by the drawing and the pen tip was colored.

TABLE 1

|  | Example 1 | Example 2 | Example 3 | Example 4 | Example 5 |
|---|---|---|---|---|---|
| Colorant | Carbon black | Pigment blue 15:3 | Pigment red 122 | Pigment yellow 74 | Carbon black |
| Raw material monomers | MMA AAc | MMA AAc | MMA AAc | MMA AAc | St AAc |
| Amounts of monomers used | 5.5 0.5 | 5.5 0.5 | 5.5 0.5 | 5.5 0.5 | 5.7 0.3 |
| Total amount of monomers | 6 | 6 | 6 | 6 | 6 |
| Initiator | KPS | KPS | KPS | KPS | KPS |
| Results of observation | ○ Spherical/fixed | ○ Spherical/fixed | ○ Spherical/fixed | ○ Spherical/fixed | ○ Spherical/fixed |
| Scattering state | ○ | ○ | ○ | ○ | ○ |
| Dispersion stability | ○ | ○ | ○ | ○ | ○ |
| Zeta potential of electric charge of colorant surface (mV) | −60.5 | −91.2 | −68.4 | −75.3 | −56.3 |
| Average dispersion particle diameter (nm) | 128 | 122 | 123 | 131 | 125 |
| Tg (° C.) | 105 | 105 | 105 | 105 | 110 |
| Surface functional group density (μmol/g) | 375 | 285 | 296 | 270 | 298 |

MMA: methyl methacrylate; AAc: acrylic acid St: styrene; KPS: potassium persulfate

TABLE 2

|  | Example 6 | Example 7 | Example 8 | Example 9 | Example 10 |
|---|---|---|---|---|---|
| Colorant | Carbon black | Carbon black | Carbon black | Carbon black | Carbon black |
| Raw material monomers | MMA AAc | BzMA BA | MMA NaSS | BA M230G AAc | BzMA M90G AAc |
| Amounts of monomers used | 5.7 0.3 | 4.5 1.2 0.3 | 17.2 0.8 | 4.0 1.5 0.5 | 3.0 2.5 0.5 |
| Total amount of monomers | 6 | 6 | 18 | 6 | 6 |
| Initiator | KPS | KPS | KPS | KPS | KPS |
| Results of observation | ○ Spherical/fixed | ○ Spherical/partly fused | ○ Spherical/fixed | ○ flat/fused | ○ flat/fused |
| Scattering state | ○ | ○ | ○ | ○ | ○ |
| Dispersion stability | ○ | ○ | ○ | ○ | ○ |
| Zeta potential of electric charge of colorant surface (mV) | −61.3 | −60.2 | −58.3 | −64.5 | −69.3 |
| Average dispersion particle diameter (nm) | 125 | 136 | 137 | 120 | 121 |
| Tg (° C.) | 105 | 30 | 115 | −55 | −25 |

TABLE 2-continued

|  | Example 6 | Example 7 | Example 8 | Example 9 | Example 10 |
|---|---|---|---|---|---|
| Surface functional group density ($\mu$mol/g) | 346 | 329 | 280 | 349 | 361 |

MMA: methyl methacrylate; AAc: acrylic acid BA: butyl acrylate; BzMA: benzyl methacrylate NaSS: sodium p-styrenesulfonate M230G: methoxypolyethyleneglycol monomethacrylate (molecular weight: about 1,100) M90G: methoxypolyethyleneglycol monomethacrylate (molecular weight: about 500) KPS: potassium persulfate

TABLE 3

|  | Comp. Example 1 | Comp. Example 2 | Comp. Example 3 | Comp. Example 4 | Comp. Example 5 |
|---|---|---|---|---|---|
| Colorant | Carbon black | Carbon black | Carbon black | Carbon black | Carbon black |
| Results of observation | — | x | x | x | x |
| Scattering state | — | — | x | x | x |
| Zeta potential of electric charge of colorant surface (mV) | ○ −59.3 | x | x | ○ −57.3 | ○ −58.6 |
| Dispersion stability | ○ | ○ | ○ | ○ | ○ |
| Average dispersion particle diameter (nm) | 128 | 122 | 123 | 131 | 125 |

TABLE 4

|  | Example 1 | Example 2 | Example 3 | Example 4 | Example 5 |
|---|---|---|---|---|---|
| Colorant | Carbon black | Pigment blue 15:3 | Pigment red 122 | Pigment yellow 74 | Carbon black |
| Image density (OD) | A | A | A | A | A |
| Rubfastness | A | A | A | A | A |
| Marker resistance | A | A | A | A | A |

TABLE 5

|  | Example 6 | Example 7 | Example 8 | Example 9 | Example 10 |
|---|---|---|---|---|---|
| Colorant | Carbon black | Carbon black | Carbon black | Carbon black | Carbon black |
| Image density (OD) | A | A | A | A | A |
| Rubfastness | A | A | A | A | A |
| Marker resistance | A | A | A | A | A |

TABLE 6

|  | Comp. Example 1 | Comp. Example 2 | Comp. Example 3 | Comp. Example 4 | Comp. Example 5 |
|---|---|---|---|---|---|
| Colorant | Carbon black | Carbon black | Carbon black | Carbon black | Carbon black |
| Image density (OD) | A | C | B | A | B |
| Rubfastness | C | A | B | B | B |
| Marker resistance | C | B | B | B | B |

The results of observation were excellent in all the examples to prove that the colorants were excellent in terms of dispersion stability. Further, all the recording inks showed an excellent printing performance.

Examples 11 and 12

Dispersible colorants were prepared by using the colorant of Example 1 and changing the production conditions while not changing the type of the monomer mixture liquid and the mixing ratio.

Example 11

100 parts of Pigment dispersion liquid 1 prepared as in Example 1 were used and heated to 70° C. in a nitrogen atmosphere and a mixture liquid as described below was gradually added dropwise into the dispersion liquid with stirring by means of a motor to effect polymerization for 8 hours. The mixture liquid contained 5.5 parts of methyl methacrylate, 0.5 part of acrylic acid, 0.12 part of potassium hydroxide, 0.05 part of potassium persulfate, 0.2 part of styrene/acrylic acid type resin dispersing agent (copolymerization ratio: 70:30; Mw=8,000; acid value: 170) and 20 parts of water. The styrene/acrylic acid type resin dispersing agent used in this example was a 20% aqueous solution thereof obtained by addition of water and potassium hydroxide of an amount equivalent to the above acid value, followed by stirring at 80° C. The obtained dispersion liquid was diluted to 10 times volume with water and aggregate components were removed by centrifugation at 5,000 rpm for 10 minutes. Thereafter, it was further subjected to centrifugation at 12,500 rpm for 2 hours to obtain Dispersible colorant 11 as precipitate. Formulation was performed as in Example 1 such that the concentration of the obtained Dispersible colorant 11 was 4% to prepare Recording Ink 11 of this example.

Example 12

100 parts of Pigment dispersion liquid 1 prepared as in Example 1 were used and heated to 70° C. in a nitrogen atmosphere and a mixture liquid as described below was gradually added dropwise into the dispersion liquid with stirring by means of a motor to effect polymerization for 8 hours. The mixture liquid contained 5.5 parts of methyl methacrylate, 0.5 part of acrylic acid, 0.12 part of potassium hydroxide, 0.05 part of potassium persulfate, 0.2 part of styrene/acrylic acid type resin dispersing agent (copolymerization ratio: 25:75; Mw=6,000; acid value: 420) and 20 parts of water. The styrene/acrylic acid type resin dispersing agent used in this example was a 20% aqueous solution thereof obtained by addition of water and potassium hydroxide of an amount equivalent to the above acid value, followed by stirring at 80° C. The obtained dispersion liquid was diluted to 10 times volume with water and aggregate components were removed by centrifugation at 5,000 rpm for 10 minutes. Thereafter, it was further subjected to centrifugation at 12,500 rpm for 2 hours to obtain Dispersible colorant 12 as precipitate. Formulation was performed as in Example 1 such that the concentration of the obtained Dispersible colorant 12 was 4% to prepare Recording Ink 12 of this example.

[Evaluation]

(Resin Mass/Pigment Mass Ratio of Dispersible Colorant)

The resin mass/pigment mass ratio (B/P) of each of the dispersible colorants obtained in Examples 1, 11 and 12 was measured. More specifically, each of the colorants was subjected to centrifugation at 80,000 rpm for 2 hours and the obtained precipitate was dried, weighed and heated in the atmosphere by means of TGA/SDTA851 (trade name; available from Mettler-Toledo International Inc.) to determine the change in the mass of each of the colorant and the resin component before and after the heating to the decomposition temperature and compute the B/P.

(Evaluation Procedures for Recording Ink and Evaluation Results)

Each of the recording inks prepared in these examples was used to perform printing by following the same procedure as Examples 1 to 10 and Comparative Examples 1 to 5. The results are shown in Table 7. The both recording inks showed good rubfastness, and it was visually confirmed that Example 11 having a large B/P ratio was particularly excellent in terms of rubfastness.

TABLE 7

|  | Example 1 | Example 11 | Example 12 |
|---|---|---|---|
| B/P ratio | 0.2 | 0.5 | 0.13 |
| Rubfastness | A | A | A |

Example 13

Recording Ink 16 was prepared in a manner as described below by using Colorant 5 having a surface charge of a polarity opposite to that of Example 1. Firstly, 1.69 g of silver nitrate was added to a solution of 3.08 g of $H_3N^+$ $C_6H_4N^+(CH_3)_3Cl^-.I^-$ in 30 g of water with stirring. The produced precipitate was removed by filtration and the filtrate was added with stirring to a suspension in which 10 g of carbon black with a specific surface area of 230 m²/g and a DBPA of 70 ml/100 g were dispersed in 70 g of water. Then, 2.25 g of concentrated nitric acid was added thereto, and a solution of 0.83 g of sodium nitrite in 10 g of water was added thereto. Consequently, a diazonium salt having $N_2^+C_6H_4N^+(CH_3)_3$ group reacted with carbon black to generate nitrogen gas. After the generation of bubbles of nitrogen gas stopped, the dispersion liquid was dried in an oven at 120° C. As a result, a reaction product having $C_6H_4N^+$ $(CH_3)_3$ group attached to the surfaces of carbon black was obtained. The obtained carbon black powder was redispersed in water to obtain a self-dispersible carbon black dispersion of a pigment concentration of 15%. The counter ions of the obtained carbon black were converted into a conjugate base of acetic acid by means of an ion exchange resin to obtain a carbon black dispersion product (Colorant 5). Then, water was added thereto and adjustment was performed so as to attain 10 parts in terms of solid content to thereby give Pigment dispersion liquid 16. It was found that the obtained Pigment dispersion liquid 16 was in a well dispersed state with an average particle diameter of 105 nm and the polydispersity index was 0.19.

Then, 100 parts of Pigment dispersion liquid 16 was heated to 55° C. in a nitrogen atmosphere and a mixture liquid having a composition as described below was gradually added dropwise thereto with stirring by means of a motor to effect polymerization for 7 hours. The mixture liquid contained 4.2 parts of benzyl methacrylate, 1.8 parts of dimethylaminoethyl acrylate, 0.3 part of potassium persulfate, sodium thiosulfate of a number of mols equivalent to the potassium persulfate, and 20 parts of water. After the polymerization, the obtained dispersion liquid was diluted to 10 times volume and subjected to centrifugation at 5,000 rpm for 10 minutes to remove aggregate components to give Dispersible colorant 16.

The state of fixing of chargeable resin pseudo fine particles to colorant of the obtained dispersible colorant was observed and confirmed and the dispersibility of the colorant itself was observed as in Example 1. Further, an ink was prepared as in Example 1. Then, observation and measurement of various physical properties thereof were carried out following the same procedure as in Example 1. Table 8 shows the obtained results. Moreover, the recording ink was used to effect printing and evaluated as in Example 1. Table 9 shows the obtained results.

TABLE 8

|  | Example 13 |
|---|---|
| Colorant | Carbon black |
| Raw material monomers | BzMA |
|  | DMAEA |
| Amounts of monomers used | 4.2 |
|  | 1.8 |
| Total amount of monomers | 6 |
| Initiator | KPS/NaTS |
| Results of observation | ∘ |
|  | Spherical/fixed |
| Scattering state | ∘ |
| Dispersion stability | ∘ |
| Zeta potential of electric charge of colorant surface (mV) | 18 |
| Average dispersion particle diameter (nm) | 135 |
| Tg (° C.) | 95 |
| Surface functional group density (μmol/g) | 272 |

DMAEA: dimethylaminoethyl acrylate
NaTS: sodium thiosulfate

TABLE 9

|  | Example 13 |
|---|---|
| Colorant | Carbon black |
| Image density (OD) | A |
| Rubfastness | A |
| Marker resistance | A |

According to the present invention, by a method of adhering and fixing a resin a water-insoluble colorant, i.e., by improving the state of adhesion/fixation and shape of the resin adhered and fixed to the colorant as well as the surface characteristics of the water-insoluble colorant itself, it has become possible to process the surface of the colorant so as to exploit both the characteristic features of the resin adhered and fixed thereto and the characteristic features of the surface of the water-insoluble colorant. Thus, it has become possible to provide a dispersible colorant that has sufficiently high dispersibility and a simple and easy method of producing such a colorant, by use of a colorant that is essentially water-insoluble. Further, it has become possible to provide an aqueous ink for ink jet recording that is formed by using such a dispersible colorant and ensures that the colorant can stably be dispersed in the ink and the printed matter obtained by using the ink strikes a balance between an excellent image quality (image density), and excellent rubfastness and excellent marker resistance.

This application claims priority from Japanese Patent Application No. 2004-188559 filed Jun. 25, 2004, which is hereby incorporated by reference herein.

What is claimed is:

1. A dispersible colorant comprising a colorant and a chargeable resin pseudo fine particle of a size smaller than the size of the colorant being fixed or fused to the colorant, wherein the colorant itself has a surface charge.

2. The dispersible colorant according to claim 1, wherein the chargeable resin pseudo fine particle is present in plurality scatteringly and fixed to the colorant.

3. The dispersible colorant according to claim 1, wherein the chargeable resin pseudo fine particle has a flat shape and is present in plurality scatteringly and fused to the colorant.

4. The dispersible colorant according to claim 1, wherein the surface charge of the colorant itself when measured in terms of a surface zeta potential in pure water has an average value of not less than −100 mV but no more than −15 mV and the distribution thereof has a standard deviation of less than 50.

5. The dispersible colorant according to claim 1, wherein the surface charge of the colorant itself when measured in terms of a surface zeta potential in pure water has an average value of not less than +10 mV but no more than +70 mV and the distribution thereof has a standard deviation of less than 50.

6. The dispersible colorant according to claim 1, wherein a polar group is bonded to a surface of the colorant itself.

7. The dispersible colorant according to claim 6, wherein the polar group bonded to the surface of the colorant itself is an anionic or cationic group.

8. The dispersible colorant according to claim 1, wherein a polar group having the same polarity as the chargeable resin pseudo fine particle is chemically bonded to a surface of the colorant itself.

9. The dispersible colorant according to claim 1, which has a surface functional group density of not less than 250 µmol/g but no more than 1,000 µmol/g.

10. The dispersible colorant according to claim 1, wherein the colorant has a heating loss of not less than 2% but no more than 20%.

11. The dispersible colorant according to claim 1, wherein the chargeable resin pseudo fine particle comprises a copolymer comprising monomer components including at least one kind of hydrophobic monomer and at least one kind of hydrophilic monomer.

12. A method of producing a dispersible colorant comprising the steps of:
preparing an aqueous dispersion solution having dispersed therein a water-insoluble colorant having at least one kind of polar group bonded directly or through an atomic group to a surface thereof; and
subjecting radically polymerizable monomers to aqueous precipitation polymerization by use of an aqueous radical polymerization initiator in the aqueous dispersion solution, thereby forming a dispersible colorant comprising a chargeable resin pseudo fine particle fixed or fused to a surface of the water-insoluble colorant.

13. The method according to claim 12, wherein the radically polymerizable monomer includes at least one kind of hydrophobic monomer and at least one kind of hydrophilic monomer.

14. The method according to claim 12, wherein before or during the aqueous precipitation polymerization of the radically polymerizable monomers using the aqueous radical polymerization initiator, a water-soluble polymer is added into a polymerization system.

15. The method according to claim 14, wherein the water-soluble polymer comprises a polymer dispersing agent having an acid value of not less than 100 but no more than 250 or an amine value of not less than 150 but no more than 300.

16. A dispersible colorant produced by the method as set forth in claim 12.

17. An aqueous ink comprising the dispersible colorant as set forth in claim 1.

18. The aqueous ink according to claim 17, wherein the colorant that constitutes the dispersible colorant is a pigment and the ratio of the total resin component in the ink to the pigment (resin mass/pigment mass=B/P) is not less than 0.1 but no more than 4.0.

19. An ink tank containing the aqueous ink as set forth in claim 17.

20. An ink jet recording apparatus having mounted thereon the aqueous ink as set forth in claim 17.

21. An ink jet recording method comprising forming an image using the aqueous ink as set forth in claim 17 by means of an ink jet recording apparatus.

22. An ink jet-recorded image formed using the aqueous ink as set forth in claim 17 by means of an ink jet recording apparatus.

* * * * *

UNITED STATES PATENT AND TRADEMARK OFFICE
CERTIFICATE OF CORRECTION

| | |
|---|---|
| PATENT NO. | : 7,297,202 B2 |
| APPLICATION NO. | : 11/311644 |
| DATED | : November 20, 2007 |
| INVENTOR(S) | : Ichinose et al. |

It is certified that error appears in the above-identified patent and that said Letters Patent is hereby corrected as shown below:

IN THE DRAWINGS:
Sheet 2, Figure 2B, "INTIATOR" should read --INITIATOR--.

COLUMN 1:
Line 57, "being paid" should read --are being made--.
Line 62, "being" should read --are being--.

COLUMN 2:
Line 55, "can not" should read --cannot--.

COLUMN 3:
Line 26, "above listed" should read --above-listed--.

COLUMN 4:
Line 54, "above described" should read --above-described--.

COLUMN 5:
Line 58, "resin a" should read --resin--.

COLUMN 6:
Line 26, "illustration" should read --illustrations--.
Line 31, "an" should read --a--.

COLUMN 8:
Line 45, "an" should read --a--.

COLUMN 9:
Lines 47-48, "computationally determine the solid content" should read --the solid content is computationally determined--.

COLUMN 10:
Line 16, "ca" should read --can--.
Line 55, "fused" should read --fused to--.

UNITED STATES PATENT AND TRADEMARK OFFICE
CERTIFICATE OF CORRECTION

PATENT NO. : 7,297,202 B2
APPLICATION NO. : 11/311644
DATED : November 20, 2007
INVENTOR(S) : Ichinose et al.

It is certified that error appears in the above-identified patent and that said Letters Patent is hereby corrected as shown below:

COLUMN 11:
Line 8, "whole;" should read --whole,--.
Line 12, "to and" should read --to, and--.
Line 12, "to the" should read --to, the--.

COLUMN 12:
Line 4, "agent, in" should read --agent. In--.
Line 44, "above listed" should read --above-listed--.
Line 65, "above listed" should read --above-listed--.

COLUMN 13:
Line 54, "are" should read --is--.
Line 59, "colorant" should read --colorant,--.

COLUMN 14:
Line 29, "thereto and" should read --thereto,--.

COLUMN 15:
Line 16, "are" should read --is--.
Line 27, "are" should read --is--.

COLUMN 16:
Line 61, "can not" should read --cannot--.

COLUMN 17:
Line 52, "above" should read --above- --.
Line 53, "water-insoluble colorant is" should read --water-insoluble colorants are--.
Line 54, "itself." should read --themselves.--.

COLUMN 18:
Line 2, "above listed" should read --above-listed--.
Line 5, "above listed" should read --above-listed--.
Line 66, "black for" should read --black is used for--.

UNITED STATES PATENT AND TRADEMARK OFFICE
CERTIFICATE OF CORRECTION

| | | |
|---|---|---|
| PATENT NO. | : 7,297,202 B2 | |
| APPLICATION NO. | : 11/311644 | |
| DATED | : November 20, 2007 | |
| INVENTOR(S) | : Ichinose et al. | |

It is certified that error appears in the above-identified patent and that said Letters Patent is hereby corrected as shown below:

COLUMN 22:
Line 59, "a position" should read --α position,--.
Line 61, "monomers" should read --monomer--.
Line 62, "a position," should read --α position,--.

COLUMN 23:
Line 1, "a position" should read --α position--.
Line 30, "has" should read --have--.

COLUMN 24:
Line 20, "above listed" should read --above-listed--.
Line 28, "above listed" should read --above-listed--.
Line 55, "film forming" should read --film-forming--.

COLUMN 25:
Line 5, "colorant" should read --colorant used is one--.
Line 6, "above is used," should read --above,--.
Line 8, "film forming" should read --film-forming--.

COLUMN 26:
Line 38, "become to be" should read --become--.
Line 51, "dispersion in" should read --dispersion, in--.
Line 53, "water is" should read --water, is--.
Line 61, "an" should read --a--.

COLUMN 28:
Line 17, "therein" should read --therein,--.
Line 35, "becomes" should read --become--.
Line 43, "adsorb" should read --adsorbs--.
Line 56, "are" should read --is--.
Line 57, "so that" should read --and--.

UNITED STATES PATENT AND TRADEMARK OFFICE
CERTIFICATE OF CORRECTION

| | |
|---|---|
| PATENT NO. | : 7,297,202 B2 |
| APPLICATION NO. | : 11/311644 |
| DATED | : November 20, 2007 |
| INVENTOR(S) | : Ichinose et al. |

It is certified that error appears in the above-identified patent and that said Letters Patent is hereby corrected as shown below:

COLUMN 30:
Line 40, "drowise" should read --dropwise--.

COLUMN 31:
Line 10, "shave" should read --share--.
Line 36, "no" should read --not--.
Line 40, "part" should read --parts--.

COLUMN 32:
Line 35, "above listed" should read --above-listed--.
Line 41, "above listed" should read --above-listed--.

COLUMN 33:
Line 27, "has" should read --have--.
Line 44, "formation" should read --formation;--.

COLUMN 34:
Line 28, "contract" should read --contraction--.

COLUMN 36:
Line 46, "Chemicals, Co." should read --Chemicals Co.,--.

COLUMN 37:
Line 16, "an" should read --a--.

UNITED STATES PATENT AND TRADEMARK OFFICE
CERTIFICATE OF CORRECTION

PATENT NO. : 7,297,202 B2
APPLICATION NO. : 11/311644
DATED : November 20, 2007
INVENTOR(S) : Ichinose et al.

It is certified that error appears in the above-identified patent and that said Letters Patent is hereby corrected as shown below:

COLUMN 40:
Line 66, "2%," should read --2%;--.

COLUMN 48:
Line 6, "well" should read --well- --.
Line 63, "a water-insoluble" should read --to a water-insoluble--.

Signed and Sealed this

Eighteenth Day of November, 2008

JON W. DUDAS
*Director of the United States Patent and Trademark Office*